US011911830B2

(12) United States Patent
Halasur et al.

(10) Patent No.: US 11,911,830 B2
(45) Date of Patent: Feb. 27, 2024

(54) INDEXABLE DRILLING INSERTS

(71) Applicant: KENNAMETAL INDIA LIMITED, Bangalore (IN)

(72) Inventors: Ravi Halasur, Bangalore (IN); Mahesh Todkar, Bangalore (IN)

(73) Assignee: KENNAMETAL INDIA LTD., Bangalore (IN)

( * ) Notice: Subject to any disclaimer, the term of this patent is extended or adjusted under 35 U.S.C. 154(b) by 744 days.

(21) Appl. No.: 16/898,641

(22) Filed: Jun. 11, 2020

(65) Prior Publication Data
US 2020/0391299 A1  Dec. 17, 2020

(30) Foreign Application Priority Data

Jun. 13, 2019  (IN) .............................. 201941023475

(51) Int. Cl.
*B23B 51/02* (2006.01)
*B23B 27/16* (2006.01)
*B23B 51/00* (2006.01)

(52) U.S. Cl.
CPC ....... *B23B 27/1611* (2013.01); *B23B 51/0008* (2022.01); *B23B 51/0011* (2022.01); *B23B 2200/0471* (2013.01); *B23B 2200/204* (2013.01)

(58) Field of Classification Search
CPC .......... B23B 2251/50; B23B 2200/204; B23B 2200/0471; B23B 2200/125; B23B 51/0011; B23B 51/0008; B23B 51/0006; B23B 27/1611
See application file for complete search history.

(56) References Cited

U.S. PATENT DOCUMENTS

| 22,394 A | 12/1858 | Norman |
| 40,297 A | 10/1863 | Wakefield |
| 44,915 A | 11/1864 | Baker |
| 190,907 A | 5/1877 | Roemer |
| 329,600 A | 11/1885 | Silver |
| 329,660 A | 11/1885 | Lord |
| 658,216 A | 9/1900 | Munger |
| 690,093 A | 12/1901 | Beach |
| 756,339 A | 4/1904 | Down |

(Continued)

FOREIGN PATENT DOCUMENTS

| AT | 9431 B | 10/1902 |
| AT | 9431 U1 | 10/2007 |

(Continued)

OTHER PUBLICATIONS

Jan. 19, 2021 Search report EP App. No. 20189283.3.

(Continued)

*Primary Examiner* — Alan Snyder
(74) *Attorney, Agent, or Firm* — Christopher J. Owens

(57) ABSTRACT

Drilling tool systems including a drilling body and a drilling inserts are disclosed. The drilling inserts include four indexable cutting edges. The four cutting edges may each comprise a plurality of cutting edge segments. The plurality of cutting edge segments are provided at distinct angles with respect to a reference plane of the drilling insert to provide effective chip breaking and a stronger cutting edge at the drilling insert corners. Furthermore, the side surfaces of the drilling inserts allow the drilling insert to be more stably supported in a pocket of the drilling body. The drilling inserts may be used in a central pocket of a drilling body.

20 Claims, 7 Drawing Sheets

(56) References Cited

U.S. PATENT DOCUMENTS

| | | |
|---|---|---|
| 756,399 A | 4/1904 | Nichols |
| 932,071 A | 8/1909 | Urbscheit |
| 1,144,088 A | 6/1915 | Ains |
| 1,461,548 A | 7/1923 | West |
| 1,508,594 A | 9/1924 | Brubakeyr, Jr. |
| 1,508,595 A | 9/1924 | Brubaker, Jr. |
| 1,630,602 A | 5/1927 | Blanco |
| 2,158,120 A | 5/1939 | Hirschberg |
| 2,289,583 A | 7/1942 | Malone |
| 2,289,683 A | 7/1942 | Rzeppa et al. |
| 2,294,969 A | 9/1942 | Albert et al. |
| 2,325,973 A | 8/1943 | Samuel et al. |
| 2,360,385 A | 10/1944 | Anderson |
| 2,423,790 A | 7/1947 | Nelson |
| 2,786,373 A | 3/1957 | Kenneth et al. |
| 3,037,264 A | 6/1962 | Mossberg |
| 3,040,605 A | 6/1962 | Andreasson |
| 3,045,513 A | 7/1962 | Andreasson |
| 3,140,749 A | 7/1964 | Joseph et al. |
| 3,153,356 A | 10/1964 | Dearborn |
| 3,153,366 A | 10/1964 | Yasuaki |
| 3,293,727 A | 12/1966 | Simms |
| 3,359,837 A | 12/1967 | Andreasson |
| 3,410,749 A | 11/1968 | Chmiel |
| 3,434,553 A | 3/1969 | Weller et al. |
| 3,436,990 A | 4/1969 | Tourison et al. |
| 3,548,688 A | 12/1970 | Kuch |
| 3,765,496 A | 10/1973 | Flores et al. |
| 3,913,196 A | 10/1975 | Maday |
| 4,072,438 A | 2/1978 | Powers |
| 4,220,429 A | 9/1980 | Powers et al. |
| 4,293,253 A | 10/1981 | Ott |
| D262,219 S | 12/1981 | Lassiter |
| D263,598 S | 3/1982 | Lassiter |
| 4,340,327 A | 7/1982 | Martins |
| D273,387 S | 4/1984 | Lassiter |
| D273,388 S | 4/1984 | Lassiter |
| D273,389 S | 4/1984 | Lassiter |
| D273,390 S | 4/1984 | Lassiter |
| D273,391 S | 4/1984 | Lassiter |
| D273,682 S | 5/1984 | Lassiter |
| D274,436 S | 6/1984 | Lassiter |
| 4,475,851 A | 10/1984 | Hale |
| 4,507,028 A | 3/1985 | Matsushita |
| 4,556,347 A | 12/1985 | Barish |
| 4,561,812 A | 12/1985 | Linden |
| 4,563,113 A | 1/1986 | Ebenhoch |
| 4,572,714 A | 2/1986 | Suzuki et al. |
| 4,606,680 A | 8/1986 | Striegl |
| 4,643,621 A | 2/1987 | Fuller, Jr. et al. |
| 4,648,760 A | 3/1987 | Karlsson et al. |
| 4,744,704 A | 5/1988 | Galvefors |
| 4,756,650 A | 7/1988 | Wakihira et al. |
| 4,844,643 A | 7/1989 | Icks |
| 4,890,963 A | 1/1990 | Keritsis |
| 4,950,108 A | 8/1990 | Roos |
| 4,990,036 A | 2/1991 | Eklund et al. |
| 5,024,563 A | 6/1991 | Randall |
| 5,114,286 A | 5/1992 | Calkins |
| 5,154,549 A | 10/1992 | Isobe et al. |
| 5,154,550 A | 10/1992 | Isobe et al. |
| 5,221,164 A | 6/1993 | Allaire |
| 5,221,174 A | 6/1993 | Bokariza et al. |
| 5,228,812 A | 7/1993 | Noguchi et al. |
| 5,269,618 A | 12/1993 | Meyer |
| 5,304,181 A | 4/1994 | Caspari et al. |
| 5,312,209 A | 5/1994 | Lindblom |
| 5,340,246 A | 8/1994 | Tukala |
| 5,346,335 A | 9/1994 | Harpaz et al. |
| 5,350,261 A | 9/1994 | Takaya et al. |
| 5,354,156 A | 10/1994 | Von Haas et al. |
| 5,382,121 A | 1/1995 | Bicknell |
| 5,429,199 A | 7/1995 | Sheirer et al. |
| 5,452,971 A | 9/1995 | Nevills |
| 5,478,176 A | 12/1995 | Stedt et al. |
| 5,503,509 A | 4/1996 | Von Haas |
| 5,509,761 A | 4/1996 | Grossman et al. |
| 5,584,617 A | 12/1996 | Houser |
| 5,597,271 A | 1/1997 | Men et al. |
| 5,630,681 A | 5/1997 | Paya |
| 5,634,747 A | 6/1997 | Tukala et al. |
| 5,649,794 A | 7/1997 | Kress et al. |
| 5,678,960 A | 10/1997 | Just et al. |
| 5,685,671 A | 11/1997 | Packer et al. |
| 5,704,740 A | 1/1998 | Ebenhoch et al. |
| 5,769,577 A | 6/1998 | Boddy |
| 5,791,838 A | 8/1998 | Hamilton |
| 5,800,101 A | 9/1998 | Jindai et al. |
| 5,807,031 A | 9/1998 | Arai et al. |
| 5,863,162 A | 1/1999 | Karlsson et al. |
| 5,890,853 A | 4/1999 | Hiranaka |
| 5,901,455 A | 5/1999 | Leitenberger et al. |
| 5,904,455 A | 5/1999 | Krenzer et al. |
| 5,954,459 A | 9/1999 | Noguchi |
| 5,957,631 A | 9/1999 | Hecht |
| 5,971,672 A | 10/1999 | Hansson |
| 5,971,673 A | 10/1999 | Berglund et al. |
| 5,971,676 A | 10/1999 | Kojima |
| 5,980,166 A | 11/1999 | Ogura |
| 5,988,953 A | 11/1999 | Berglund et al. |
| 5,996,714 A | 12/1999 | Massa et al. |
| 6,000,000 A | 12/1999 | Hawkins et al. |
| 6,012,881 A | 1/2000 | Scheer |
| 6,019,553 A | 2/2000 | Yakamavich, Jr. |
| 6,030,155 A | 2/2000 | Scheer et al. |
| 6,039,515 A | 3/2000 | Lamberg |
| 6,045,301 A | 4/2000 | Kammermeier et al. |
| 6,045,305 A | 4/2000 | Plummer |
| 6,050,754 A | 4/2000 | Thomas |
| 6,059,492 A | 5/2000 | Hecht |
| 6,071,045 A | 6/2000 | Janness |
| 6,109,841 A | 8/2000 | Johne |
| 6,116,825 A | 9/2000 | Kammermeier et al. |
| 6,123,488 A | 9/2000 | Kasperik et al. |
| 6,132,149 A | 10/2000 | Howarth et al. |
| 6,168,355 B1 | 1/2001 | Wardell |
| 6,186,705 B1 | 2/2001 | Kumar et al. |
| 6,190,097 B1 | 2/2001 | Thomas |
| 6,210,083 B1 | 4/2001 | Kammermeier et al. |
| 6,257,807 B1 | 7/2001 | Heinloth |
| 6,261,034 B1 | 7/2001 | Cselle |
| 6,267,541 B1 | 7/2001 | Isakov et al. |
| 6,276,879 B1 | 8/2001 | Hecht |
| 6,283,682 B1 | 9/2001 | Plummer |
| 6,439,811 B1 | 8/2002 | Wardell |
| 6,443,674 B1 | 9/2002 | Jaconi |
| 6,447,218 B1 | 9/2002 | Lagerberg |
| 6,481,938 B2 | 11/2002 | Widin |
| 6,485,235 B1 | 11/2002 | Mast et al. |
| 6,506,003 B1 | 1/2003 | Erickson |
| 6,514,019 B1 | 2/2003 | Schulz |
| 6,524,034 B2 | 2/2003 | Eng et al. |
| 6,530,728 B2 | 3/2003 | Eriksson |
| 6,543,970 B1 | 4/2003 | Qvarth et al. |
| 6,582,164 B1 | 6/2003 | McCormick |
| 6,582,184 B2 | 6/2003 | Little, Jr. |
| 6,585,460 B1 | 7/2003 | Meece et al. |
| 6,595,305 B1 | 7/2003 | Dunn et al. |
| 6,595,727 B2 | 7/2003 | Arvidsson |
| 6,626,614 B2 | 9/2003 | Nakamura |
| 6,648,561 B2 | 11/2003 | Kraemer |
| 6,652,203 B1 | 11/2003 | Risen, Jr. |
| 6,821,061 B2 | 11/2004 | Frejd |
| 6,840,717 B2 | 1/2005 | Eriksson |
| 6,948,891 B2 | 9/2005 | Roman |
| 7,008,150 B2 | 3/2006 | Krenzer |
| 7,048,480 B2 | 5/2006 | Borschert et al. |
| 7,070,367 B2 | 7/2006 | Krenzer |
| 7,101,125 B2 | 9/2006 | Borschert et al. |
| 7,114,892 B2 | 10/2006 | Hansson |
| 7,125,207 B2 | 10/2006 | Craig et al. |
| 7,134,816 B2 | 11/2006 | Brink |
| 7,189,437 B2 | 3/2007 | Kidd et al. |
| 7,198,437 B2 | 4/2007 | Jonsson |

(56) References Cited

U.S. PATENT DOCUMENTS

| | | |
|---|---|---|
| 7,201,542 B2 | 4/2007 | Fritsch et al. |
| 7,237,985 B2 | 7/2007 | Leuze et al. |
| 7,296,497 B2 | 11/2007 | Kugelberg et al. |
| 7,306,410 B2 | 12/2007 | Borschert et al. |
| 7,309,196 B2 | 12/2007 | Ruy Frota De Souza |
| 7,311,480 B2 | 12/2007 | Heule et al. |
| 7,360,974 B2 | 4/2008 | Borschert et al. |
| 7,377,730 B2 | 5/2008 | Hecht et al. |
| 7,407,350 B2 | 8/2008 | Hecht et al. |
| 7,431,543 B2 | 10/2008 | Buettiker et al. |
| 7,467,915 B2 | 12/2008 | De Souza |
| 7,476,067 B2 | 1/2009 | Borschert et al. |
| 7,559,382 B2 | 7/2009 | Koch |
| 7,591,617 B2 | 9/2009 | Borschert et al. |
| D607,024 S | 12/2009 | Dost et al. |
| 7,625,161 B1 | 12/2009 | Ruy Frota De Souza |
| 7,677,842 B2 | 3/2010 | Park |
| 7,740,427 B2 | 6/2010 | Heule et al. |
| 7,740,472 B2 | 6/2010 | Delamarche et al. |
| 7,775,751 B2 | 8/2010 | Hecht et al. |
| 7,832,967 B2 | 11/2010 | Borschert et al. |
| D632,320 S | 2/2011 | Chen et al. |
| D633,534 S | 3/2011 | Chen et al. |
| 7,972,094 B2 | 7/2011 | Men et al. |
| RE42,644 E | 8/2011 | Jonsson |
| 7,997,832 B2 | 8/2011 | Prichard et al. |
| 7,997,836 B2 | 8/2011 | Kim et al. |
| 8,007,202 B2 | 8/2011 | Davis et al. |
| 8,007,207 B2 | 8/2011 | Rimet |
| 8,007,208 B2 | 8/2011 | Noureddine |
| 8,021,088 B2 | 9/2011 | Hecht |
| 8,142,116 B2 | 3/2012 | Frejd |
| D668,697 S | 10/2012 | Hsu |
| D669,923 S | 10/2012 | Watson et al. |
| 8,366,358 B2 | 2/2013 | Borschert et al. |
| 8,376,669 B2 | 2/2013 | Jaeger et al. |
| 8,430,609 B2 | 4/2013 | Frejd |
| 8,449,227 B2 | 5/2013 | Danielsson |
| 8,454,274 B2 | 6/2013 | Chen et al. |
| 8,534,966 B2 | 9/2013 | Hecht |
| 8,556,552 B2 | 10/2013 | Hecht |
| 8,596,935 B2 | 12/2013 | Fang et al. |
| 8,651,778 B2 | 2/2014 | Okumura |
| 8,678,722 B2 | 3/2014 | Aare |
| 8,678,723 B2 | 3/2014 | Osawa et al. |
| RE44,915 E | 5/2014 | De Souza |
| 8,721,235 B2 | 5/2014 | Kretzschmann et al. |
| D708,034 S | 7/2014 | Huang |
| 8,784,018 B2 | 7/2014 | Pabel |
| 8,784,019 B2 | 7/2014 | Pabel |
| D711,719 S | 8/2014 | DeBaker |
| 8,807,888 B2 | 8/2014 | Borschert et al. |
| 8,882,413 B2 | 11/2014 | Hecht |
| 8,926,234 B2 | 1/2015 | Engstrom et al. |
| 8,931,982 B2 | 1/2015 | Osawa et al. |
| 8,939,685 B2 | 1/2015 | Cigni |
| 8,992,142 B2 | 3/2015 | Hecht |
| 9,028,180 B2 | 5/2015 | Hecht |
| 9,050,659 B2 | 6/2015 | Schwaegerl et al. |
| 9,073,128 B2 | 7/2015 | Mack et al. |
| 9,079,255 B2 | 7/2015 | Jager et al. |
| 9,162,295 B2 | 10/2015 | Pabel et al. |
| 9,168,589 B2 | 10/2015 | Ramesh |
| D742,714 S | 11/2015 | King, Jr. et al. |
| D742,948 S | 11/2015 | Kenno et al. |
| 9,180,650 B2 | 11/2015 | Fang et al. |
| 9,205,498 B2 | 12/2015 | Jaeger |
| 9,248,512 B2 | 2/2016 | Aare |
| 9,272,335 B2 | 3/2016 | Ramesh |
| 9,296,049 B2 | 3/2016 | Schwaegerl et al. |
| 9,302,332 B2 | 4/2016 | Scanlon et al. |
| 9,371,701 B2 | 6/2016 | Cox et al. |
| 9,481,040 B2 | 11/2016 | Schwaegerl et al. |
| 9,498,829 B2 | 11/2016 | Zabrosky |
| D798,921 S | 10/2017 | Frota De Souza Filho |
| D798,922 S | 10/2017 | Frota De Souza Filho et al. |
| 9,782,844 B2 | 10/2017 | Ogata |
| 10,207,339 B2 | 2/2019 | Park et al. |
| 10,213,845 B2 | 2/2019 | Schwagerl et al. |
| 2001/0033779 A1 | 10/2001 | Wiman et al. |
| 2001/0033780 A1 | 10/2001 | Berglund et al. |
| 2002/0057951 A1 | 5/2002 | Silver |
| 2002/0061235 A1 | 5/2002 | Maier |
| 2002/0102141 A1 | 8/2002 | Meece et al. |
| 2002/0141842 A1 | 10/2002 | Tsuzaka et al. |
| 2002/0159851 A1 | 10/2002 | Krenzer |
| 2002/0168239 A1 | 11/2002 | Mast et al. |
| 2002/0172569 A1 | 11/2002 | Nakamura |
| 2002/0195279 A1 | 12/2002 | Bise et al. |
| 2003/0039523 A1 | 2/2003 | Kemmer |
| 2003/0060133 A1 | 3/2003 | Junker |
| 2003/0091402 A1 | 5/2003 | Lindblom |
| 2003/0161696 A1 | 8/2003 | Fritsch et al. |
| 2003/0175086 A1 | 9/2003 | Muhlfriedel et al. |
| 2003/0180103 A1 | 9/2003 | Nagaya |
| 2003/0185640 A1 | 10/2003 | Ito |
| 2003/0219321 A1 | 11/2003 | Borschert et al. |
| 2003/0223832 A1 | 12/2003 | Roman et al. |
| 2003/0223833 A1 | 12/2003 | Roman |
| 2004/0042859 A1 | 3/2004 | Edvardsson et al. |
| 2004/0067115 A1 | 4/2004 | Yamamoto |
| 2004/0096281 A1 | 5/2004 | Sherman et al. |
| 2004/0101379 A1 | 5/2004 | Mabuchi et al. |
| 2004/0240949 A1 | 12/2004 | Pachao-Morbitzer et al. |
| 2005/0047951 A1 | 3/2005 | Gronquist et al. |
| 2005/0084352 A1 | 4/2005 | Borschert et al. |
| 2005/0111928 A1 | 5/2005 | Stanarius et al. |
| 2005/0135888 A1 | 6/2005 | Stokey et al. |
| 2005/0244235 A1 | 11/2005 | Kleiner |
| 2005/0260049 A1 | 11/2005 | Kruszynski |
| 2006/0006576 A1 | 1/2006 | Karos |
| 2006/0027046 A1 | 2/2006 | Kugelberg et al. |
| 2006/0072976 A1 | 4/2006 | Frota |
| 2006/0093449 A1 | 5/2006 | Hecht et al. |
| 2006/0171787 A1 | 8/2006 | Lindblom |
| 2006/0204345 A1 | 9/2006 | Borschert et al. |
| 2006/0260439 A1 | 11/2006 | Tubinger et al. |
| 2006/0288820 A1 | 12/2006 | Mirchandani et al. |
| 2007/0201962 A1 | 8/2007 | Limell et al. |
| 2008/0003072 A1 | 1/2008 | Kim et al. |
| 2008/0075547 A1 | 3/2008 | Wolf |
| 2008/0170921 A1 | 7/2008 | Sjoo |
| 2008/0175676 A1 | 7/2008 | Prichard et al. |
| 2008/0175677 A1 | 7/2008 | Prichard et al. |
| 2008/0181737 A1 | 7/2008 | Limell et al. |
| 2008/0181741 A1 | 7/2008 | Borschert et al. |
| 2008/0193231 A1 | 8/2008 | Jonsson et al. |
| 2008/0193237 A1 | 8/2008 | Men et al. |
| 2008/0219791 A1 | 9/2008 | Nasu et al. |
| 2008/0304925 A1 | 12/2008 | Meyer et al. |
| 2009/0044986 A1 | 2/2009 | Jaeger et al. |
| 2009/0067942 A1 | 3/2009 | Tanaka |
| 2009/0071723 A1 | 3/2009 | Mergenthaler et al. |
| 2009/0116920 A1 | 5/2009 | Bae |
| 2009/0123244 A1 | 5/2009 | Buettiker et al. |
| 2009/0238649 A1 | 9/2009 | Kruszynski et al. |
| 2009/0245949 A1 | 10/2009 | Takahashi |
| 2009/0311055 A1 | 12/2009 | Galota et al. |
| 2009/0311060 A1 | 12/2009 | Frejd |
| 2010/0021253 A1 | 1/2010 | Frejd |
| 2010/0034606 A1 | 2/2010 | Nasu et al. |
| 2010/0034607 A1 | 2/2010 | Meyer et al. |
| 2010/0061821 A1 | 3/2010 | Okumura |
| 2010/0092259 A1 | 4/2010 | Borschert et al. |
| 2010/0143059 A1 | 6/2010 | Hecht |
| 2010/0150673 A1 | 6/2010 | Schneider et al. |
| 2010/0178122 A1 | 7/2010 | Bae |
| 2010/0247255 A1 | 9/2010 | Nitzsche et al. |
| 2010/0266357 A1 | 10/2010 | Kretzschmann et al. |
| 2010/0272526 A1 | 10/2010 | Dufour et al. |
| 2010/0272529 A1 | 10/2010 | Rozzi et al. |
| 2010/0272531 A1 | 10/2010 | Shavit |
| 2010/0296884 A1 | 11/2010 | Okumura |
| 2010/0307837 A1 | 12/2010 | King et al. |

(56) References Cited

U.S. PATENT DOCUMENTS

| | | |
|---|---|---|
| 2010/0322723 A1 | 12/2010 | Danielsson |
| 2010/0322728 A1 | 12/2010 | Aare |
| 2010/0322729 A1 | 12/2010 | Pabel |
| 2010/0322731 A1 | 12/2010 | Aare |
| 2010/0322732 A1 | 12/2010 | Mergenthaler |
| 2010/0329804 A1 | 12/2010 | Okumura |
| 2011/0020072 A1 | 1/2011 | Chen et al. |
| 2011/0020073 A1 | 1/2011 | Chen et al. |
| 2011/0020077 A1 | 1/2011 | Fouquer |
| 2011/0020086 A1 | 1/2011 | Borschert et al. |
| 2011/0027021 A1 | 2/2011 | Nelson et al. |
| 2011/0081212 A1 | 4/2011 | Spichtinger et al. |
| 2011/0097168 A1 | 4/2011 | Jager et al. |
| 2011/0110735 A1 | 5/2011 | Klettenheimer et al. |
| 2011/0110739 A1 | 5/2011 | Frisendahl |
| 2011/0168453 A1 | 7/2011 | Kersten et al. |
| 2011/0229277 A1 | 9/2011 | Hoffer et al. |
| 2011/0236145 A1 | 9/2011 | Paebel et al. |
| 2011/0268518 A1 | 11/2011 | Sampath et al. |
| 2011/0299944 A1 | 12/2011 | Hofermann |
| 2011/0318128 A1 | 12/2011 | Schwagerl et al. |
| 2012/0003056 A1 | 1/2012 | Jaeger |
| 2012/0014760 A1 | 1/2012 | Glimpel et al. |
| 2012/0082518 A1 | 4/2012 | Woodruff et al. |
| 2012/0087746 A1 | 4/2012 | Fang et al. |
| 2012/0087747 A1 | 4/2012 | Fang et al. |
| 2012/0099937 A1 | 4/2012 | Osawa et al. |
| 2012/0114438 A1 | 5/2012 | Schwenck et al. |
| 2012/0121347 A1 | 5/2012 | Osawa et al. |
| 2012/0288337 A1 | 11/2012 | Sampath |
| 2012/0308319 A1 | 12/2012 | Sampath et al. |
| 2012/0315101 A1 | 12/2012 | Osawa et al. |
| 2013/0022422 A1 | 1/2013 | Ramesh |
| 2013/0022423 A1 | 1/2013 | Ramesh |
| 2013/0129435 A1 | 5/2013 | Ortlund et al. |
| 2013/0183107 A1 | 7/2013 | Fang et al. |
| 2013/0183112 A1 | 7/2013 | Schwagerl et al. |
| 2013/0209189 A1 | 8/2013 | Borschert et al. |
| 2013/0223943 A1 | 8/2013 | Gey et al. |
| 2013/0243537 A1 | 9/2013 | Ogata |
| 2013/0259590 A1 | 10/2013 | Shaheen |
| 2013/0266389 A1 | 10/2013 | Hecht |
| 2013/0302101 A1 | 11/2013 | Scanlon et al. |
| 2013/0315684 A1 | 11/2013 | Ramesh |
| 2013/0320638 A1 | 12/2013 | Dejonghe et al. |
| 2014/0023449 A1 | 1/2014 | Jonsson et al. |
| 2014/0133931 A1 | 5/2014 | Bae |
| 2014/0161552 A1 | 6/2014 | Ramesh |
| 2014/0169892 A1 | 6/2014 | Hecht |
| 2014/0212235 A1 | 7/2014 | Prast et al. |
| 2014/0255115 A1 | 9/2014 | Zabrosky |
| 2014/0255116 A1 | 9/2014 | Myers et al. |
| 2014/0260808 A1 | 9/2014 | Sweetman et al. |
| 2014/0286719 A1 | 9/2014 | Ramesh |
| 2014/0301799 A1 | 10/2014 | Schwaegerl et al. |
| 2014/0321931 A1 | 10/2014 | Gey |
| 2014/0348602 A1 | 11/2014 | Schwaegerl et al. |
| 2015/0063926 A1 | 3/2015 | Wu et al. |
| 2015/0063931 A1 | 3/2015 | Wu et al. |
| 2015/0104266 A1 | 4/2015 | Guter |
| 2015/0174671 A1 | 6/2015 | Maurer |
| 2015/0266107 A1 | 9/2015 | Gonen et al. |
| 2015/0273597 A1 | 10/2015 | Aliaga et al. |
| 2015/0298220 A1 | 10/2015 | Ach et al. |
| 2015/0321267 A1 | 11/2015 | Takai |
| 2015/0328696 A1 | 11/2015 | Wang et al. |
| 2015/0360302 A1 | 12/2015 | Guter |
| 2016/0001379 A1 | 1/2016 | Kauper |
| 2016/0001381 A1 | 1/2016 | Lach |
| 2016/0016236 A1 | 1/2016 | Evans |
| 2016/0023282 A1 | 1/2016 | Ramesh |
| 2016/0031016 A1 | 2/2016 | Takai |
| 2016/0059323 A1 | 3/2016 | Riester |
| 2016/0207122 A1 | 7/2016 | Chen |
| 2016/0229017 A1 | 8/2016 | Guy |
| 2016/0263663 A1 | 9/2016 | Schwaegerl et al. |
| 2016/0263664 A1 | 9/2016 | Son et al. |
| 2016/0263666 A1 | 9/2016 | Myers et al. |
| 2016/0297011 A1 | 10/2016 | Park et al. |
| 2016/0311035 A1 | 10/2016 | Peng et al. |
| 2017/0001248 A1 | 1/2017 | Ramesh |
| 2017/0028480 A1 | 2/2017 | Schwagerl et al. |
| 2017/0100784 A1 | 4/2017 | Frota et al. |
| 2018/0029141 A1 | 2/2018 | Ishi |
| 2018/0111205 A1 | 4/2018 | Ishi |
| 2018/0133809 A1 | 5/2018 | Brunner |
| 2018/0272442 A1 | 9/2018 | Jäger |
| 2020/0238397 A1 | 7/2020 | No |
| 2021/0046555 A1 | 2/2021 | Todkar |

FOREIGN PATENT DOCUMENTS

| | | |
|---|---|---|
| BR | PI0412870 A | 10/2006 |
| BR | PI0412870 B1 | 8/2017 |
| CN | 1160370 A | 9/1997 |
| CN | 1197709 A | 11/1998 |
| CN | 1204976 A | 1/1999 |
| CN | 1251327 A | 4/2000 |
| CN | 1258240 A | 6/2000 |
| CN | 1066656 C | 6/2001 |
| CN | 2438535 Y | 7/2001 |
| CN | 2481440 Y | 3/2002 |
| CN | 1616170 A | 5/2005 |
| CN | 1655899 A | 8/2005 |
| CN | 1689740 A | 11/2005 |
| CN | 1692998 A | 11/2005 |
| CN | 1798623 A | 7/2006 |
| CN | 101048251 A | 10/2007 |
| CN | 101301688 A | 11/2008 |
| CN | 100455390 C | 1/2009 |
| CN | 101605622 A | 12/2009 |
| CN | 101610866 A | 12/2009 |
| CN | 201505750 U | 6/2010 |
| CN | 102006958 A | 4/2011 |
| CN | 102015171 A | 4/2011 |
| CN | 102159350 A | 8/2011 |
| CN | 102307693 A | 1/2012 |
| CN | 102310214 A | 1/2012 |
| CN | 102438789 A | 5/2012 |
| CN | 103128117 A | 6/2013 |
| CN | 104096884 A | 10/2014 |
| CN | 104203468 A | 12/2014 |
| CN | 104588739 A | 5/2015 |
| CN | 204321258 U | 5/2015 |
| CN | 104759664 A | 7/2015 |
| CN | 204545517 U | 8/2015 |
| CN | 204565232 U | 8/2015 |
| CN | 204584366 U | 8/2015 |
| CN | 106163711 A | 11/2016 |
| CN | 106825693 A | 6/2017 |
| DE | 94340 C | 10/1897 |
| DE | 367010 C | 1/1923 |
| DE | 384720 C | 11/1923 |
| DE | 524677 C | 5/1931 |
| DE | 829568 C | 1/1952 |
| DE | 1106144 B | 5/1961 |
| DE | 2246965 A1 | 4/1974 |
| DE | 3133488 A1 | 3/1983 |
| DE | 8303470 U1 | 9/1983 |
| DE | 3306209 A1 | 8/1984 |
| DE | 3314349 A1 | 10/1984 |
| DE | 3545586 A1 | 7/1987 |
| DE | 3733298 A1 | 4/1989 |
| DE | 3733298 C2 | 4/1992 |
| DE | 3133488 C3 | 7/1994 |
| DE | 4314868 A1 | 11/1994 |
| DE | 19605157 A1 | 9/1996 |
| DE | 19543233 A1 | 5/1997 |
| DE | 29722002 U1 | 2/1998 |
| DE | 29809638 U1 | 8/1998 |
| DE | 19945097 A1 | 3/2001 |
| DE | 20111666 U1 | 11/2001 |
| DE | 10054850 A1 | 5/2002 |
| DE | 20204848 U1 | 6/2002 |

(56) References Cited

FOREIGN PATENT DOCUMENTS

| | | |
|---|---|---|
| DE | 20204818 U1 | 9/2002 |
| DE | 10157450 A1 | 6/2003 |
| DE | 10333340 A1 | 2/2005 |
| DE | 102004022747 A1 | 11/2005 |
| DE | 102007044095 A1 | 3/2009 |
| DE | 112009002001 T5 | 2/2013 |
| DE | 102012200690 A1 | 7/2013 |
| DE | 102013200680 A1 | 7/2013 |
| DE | 102012212146 A1 | 1/2014 |
| DE | 102013205889 B3 | 5/2014 |
| DE | 102013209371 A1 | 11/2014 |
| DE | 102014206796 A1 | 10/2015 |
| DE | 102015106374 A1 | 10/2016 |
| EP | 0054913 A2 | 6/1982 |
| EP | 0055142 A2 | 6/1982 |
| EP | 0118806 A1 | 9/1984 |
| EP | 0118806 B1 | 11/1987 |
| EP | 0589333 A1 | 3/1994 |
| EP | 0599393 A1 | 6/1994 |
| EP | 0599393 B1 | 2/1996 |
| EP | 0750960 A1 | 1/1997 |
| EP | 0813459 A1 | 12/1997 |
| EP | 0652813 B1 | 1/1999 |
| EP | 0750960 B1 | 8/1999 |
| EP | 1100642 A1 | 5/2001 |
| EP | 1136161 A1 | 9/2001 |
| EP | 0790092 B1 | 1/2002 |
| EP | 0813459 B1 | 7/2003 |
| EP | 1996358 A1 | 12/2008 |
| EP | 1476269 B1 | 10/2009 |
| EP | 2361708 A1 | 8/2011 |
| EP | 1996358 B1 | 11/2011 |
| EP | 2524755 A2 | 11/2012 |
| EP | 2551046 A1 | 1/2013 |
| FR | 907980 A | 3/1946 |
| FR | 2371263 A1 | 6/1978 |
| FR | 2829715 A1 | 3/2003 |
| GB | 191517961 A | 12/1915 |
| GB | 1395855 A | 5/1975 |
| GB | 1396855 A | 6/1975 |
| GB | 2010708 A | 7/1979 |
| GB | 2310622 A | 9/1997 |
| JP | S5537209 A | 3/1980 |
| JP | S57107718 A | 7/1982 |
| JP | S6094211 A | 5/1985 |
| JP | 60109806 | 7/1985 |
| JP | 1985109806 | 7/1985 |
| JP | S61141008 U | 9/1986 |
| JP | S61226209 A | 10/1986 |
| JP | S62213911 A | 9/1987 |
| JP | S63109908 A | 5/1988 |
| JP | H03117532 A | 5/1991 |
| JP | H03142117 A | 6/1991 |
| JP | H03184707 A | 8/1991 |
| JP | H04244311 A | 9/1992 |
| JP | H05301104 A | 11/1993 |
| JP | H069813 U | 2/1994 |
| JP | H06320323 A | 11/1994 |
| JP | H09309017 A | 12/1997 |
| JP | H1119812 A | 1/1999 |
| JP | 2000198010 A | 7/2000 |
| JP | 2002501441 A | 1/2002 |
| JP | 2002066811 A | 3/2002 |
| JP | 2002113606 A | 4/2002 |
| JP | 2002254230 A | 9/2002 |
| JP | 2003001511 A | 1/2003 |
| JP | 2003291019 A | 10/2003 |
| JP | 2003291044 A | 10/2003 |
| JP | 2003340626 A | 12/2003 |
| JP | 2004507373 A | 3/2004 |
| JP | 2004255533 A | 9/2004 |
| JP | 2005118940 A | 5/2005 |
| JP | 2005169542 A | 6/2005 |
| JP | 2005169642 A | 6/2005 |
| JP | 2006167871 A | 6/2006 |
| JP | 2008500195 A | 1/2008 |
| JP | 2008517787 A | 5/2008 |
| JP | 2008207283 A | 9/2008 |
| JP | 2009178787 A | 8/2009 |
| JP | 2010099778 | 5/2010 |
| JP | 2011036977 A | 2/2011 |
| JP | 6211769 B2 | 10/2017 |
| KR | 20080000544 A | 1/2008 |
| KR | 101014027 B1 | 2/2011 |
| RU | 1774904 A3 | 11/1992 |
| SE | 9203716 | 12/1992 |
| SE | 9701494 | 2/1999 |
| SE | 0201588 | 5/2002 |
| SE | 0201587 | 11/2003 |
| SE | 0402760 | 5/2006 |
| SE | 0500234 | 8/2006 |
| SE | 1350624 A1 | 11/2013 |
| SU | 562389 A1 | 6/1977 |
| SU | 921707 A1 | 4/1982 |
| WO | WO-8403241 A1 | 8/1984 |
| WO | WO-9412305 A1 | 6/1994 |
| WO | WO-9627469 A1 | 9/1996 |
| WO | WO-9810881 A1 | 3/1998 |
| WO | WO-9853943 A1 | 12/1998 |
| WO | WO-0007761 A1 | 2/2000 |
| WO | WO-0108840 A1 | 2/2001 |
| WO | WO-03031104 A1 | 4/2003 |
| WO | WO-03047797 A1 | 6/2003 |
| WO | WO-2007107294 A1 | 9/2007 |
| WO | WO-2008072840 A2 | 6/2008 |
| WO | WO-2008099378 A1 | 8/2008 |
| WO | WO-2009128775 A1 | 10/2009 |
| WO | WO-2010102793 A1 | 9/2010 |
| WO | WO-2014091477 A1 | 6/2014 |
| WO | WO-2015064904 A1 | 5/2015 |
| WO | WO-2015165872 A1 | 11/2015 |
| WO | WO2019039724 A1 | 2/2019 |

OTHER PUBLICATIONS

Jan. 6, 2023 Non-Final Office Action U.S. Appl. No. 16/992,833, 13 Pages.
Jun. 20, 2022 Final Office Action (US Only) U.S. Appl. No. 20210046555A1.
Oct. 3, 2022 Final Rejection U.S. Appl. No. 16/898,811, 8 pages.
Jul. 23, 2021 EPO Notification R.70b(1) EP App. No. 3778083.
Jan. 10, 2023 Notice of Allowance U.S. Appl. No. 16/898,811, 7 pages.
Mar. 22, 2022 Office action (3 months) (US Only) U.S. Appl. No. 2020-0391297.
Feb. 18, 2022 Non-Final OA—U.S. Appl. No. 16/992,833, filed Feb. 18, 2022—-Non Final.pdf.
Apr. 24, 2023 Notice of Allowance for U.S. Appl. No. 16/898,811, 4 Pages.
May 10, 2023 Foreign Office Action Indian Application No. IN201941023533, 6 Pages.
Mar. 27, 2023 Notice of Allowance for U.S. Appl. No. 16/992,833, 5 Pages.
May 9, 2012 Non-Final Office Action U.S. Appl. No. 12/847,216, 13 Pages.
Nov. 2, 2012 Notice of Allowance U.S. Appl. No. 12/847,216, 6 Pages.
Dec. 24, 2013 Non-Final Office Action U.S. Appl. No. 13/756,990, 14 Pages.
Apr. 16, 2014 Notice of Allowance U.S. Appl. No. 13/756,990, 5 Pages.
May 13, 2014 German Office Action DE Application No. 102013209371.3, 12 Pages.
Jul. 7, 2015 Office Action (3 months) 1 U.S. Appl. No. 14/014,643, 19 pages.
Jul. 7, 2015 Office Action (3 months) 1 U.S. Appl. No. 14/014,668, 16 pages.
Jul. 16, 2015 International Search Report Transmitted.
Sep. 2, 2015 First office action SE No. 13500285, 8 pages.
Oct. 12, 2015 First office action IL231436, 2 pages.

(56) References Cited

OTHER PUBLICATIONS

Oct. 12, 2015 Israel First Office Action IL Application No. 229547, 4 Pages.
Oct. 22, 2015 Office Action (3 months) 1 U.S. Appl. No. 14/243,350, 22 pages.
Nov. 3, 2015 Final Office Action U.S. Appl. No. 14/014,643, 17 pages.
Nov. 6, 2015 First Office Action U.S. Appl. No. 14/014,668, 12 pages.
Dec. 8, 2015 Office Action (3 months) 1 U.S. Appl. No. 14/282,426, 18 pages.
Feb. 23, 2016 Office Action (3 months) 2 U.S. Appl. No. 14/014,668, 15 pages.
Mar. 7, 2016 Final Office Action U.S. Appl. No. 14/243,350, 17 pages.
Mar. 23, 2016 Chinese First Office Action CN Application No. 201310024382.7, 18 Pages.
Apr. 8, 2016 European Union Office Action (2 months) EM Application No. 3041961, 2 Pages.
Apr. 12, 2016 Second Office Action DE App. No. 10207257.4, 12 pages.
May 17, 2016 Advisory Action U.S. Appl. No. 14/243,350, 3 pages.
May 26, 2016 Notice of Allowance CN Application No. 201630064772.1, 4 Pages.
May 27, 2016 Notice of Allowance CN App. No. CN2016300589092, 4 pages.
Jun. 16, 2016 Office action (3 months) U.S. Appl. No. 14/513,590, 10 pages.
Jul. 7, 2016 Notice of Allowance U.S. Appl. No. 14/282,426, 7 Pages.
Jul. 13, 2016 First Office Action IL58345, 2 pages.
Jul. 29, 2016 Office action (3 months) 2 U.S. Appl. No. 14/243,350, 13 pages.
Aug. 2, 2016 Japan Notice of Allowance JP Application No. 2016005516, 4 Pages.
Aug. 22, 2016 Israel First Office Action IL Application No. 58345, 5 Pages.
Sep. 27, 2016 Japan First Office Action JP Application No. 2013-006979, 6 Pages.
Oct. 20, 2016 Non-Final Office Action (3 months) 1 U.S. Appl. No. 29/541,762, 15 Pages.
Oct. 25, 2016 Non-Final Office Action (3 months) 1 U.S. Appl. No. 29/541,767, 16 Pages.
Nov. 15, 2016 EPO Notification R161(1) & R. 162, EP Application No. 15717103.4, 4 Pages.
Nov. 16, 2016 Second Office Action CN Application No. 201310024382.7, 10 Pages.
Nov. 23, 2016 Final Office Action 2 U.S. Appl. No. 14/243,350, 14 Pages.
Dec. 30, 2016 Final Office Action U.S. Appl. No. 14/513,590, 9 pages.
Feb. 10, 2017 Advisory Action (PTOL-303) 2 U.S. Appl. No. 14/243,350, 03 Pages.
Feb. 13, 2017 Notice of Allowance U.S. Appl. No. 29/541,762, 7 Pages.
Feb. 14, 2017 Notice of Allowance U.S. Appl. No. 29/541,767, 11 Pages.
Feb. 24, 2017 Advisory Action (PTOL-303) U.S. Appl. No. 14/513,590 2 pages.
Mar. 10, 2017 Office action (3 months) U.S. Appl. No. 14/877,604, 34 pages.
Mar. 17, 2017 Notice of Allowance CN Application No. 201310024382.7, 05 Pages.
Mar. 21, 2017 Non-Final Office Action (3 months) 1 U.S. Appl. No. 14/877,685, 31 Pages.
Mar. 22, 2017 First office action German App. No. DE102013220884.7, 6 pages.
Mar. 22, 2017 Non-Final Office action (3 months) U.S. Appl. No. 14/669,298, 18 pages.
Apr. 1, 2017 First Office Action CN Application No. 201410207255.5, 20 Pages.
Apr. 6, 2017 First Office Action DE Application No. 102014206796.0, 11 Pages.
Apr. 6, 2017 Israel Second Office Action IL Application No. 231436, 10 Pages.
Apr. 19, 2017 First Office Action CN Application No. 201410129013.9, 18 Pages.
May 9, 2017 Japan Second Office Action JP Application No. 2013-006979, 8 Pages.
May 23, 2017 Notice of Allowance U.S. Appl. No. 29/541,767, 32 Pages.
May 25, 2017 Notice of Allowance U.S. Appl. No. 29/541,762, 32 Pages.
May 25, 2017 Office Action (3 months) 3 U.S. Appl. No. 14/243,350, 14 Pages.
Jun. 27, 2017 Office action (3 months) U.S. Appl. No. 14/513,590, 32 pages.
Jul. 14, 2017 Office Action (3 months) 1 U.S. Appl. No. 15/190,284, 36 Pages.
Aug. 22, 2017 Japan Notice of Allowance JP Application No. 2013-006979, 6 Pages.
Aug. 22, 2017 Notice of Allowance CN Application No. 201310677120.0, 5 Pages.
Sep. 6, 2017 Final Office Action U.S. Appl. No. 14/877,604, 15 pages.
Sep. 19, 2017 Final Office Action U.S. Appl. No. 14/877,685, 73 Pages.
Nov. 17 2017 German First Office Action DE Application No. 102017205166.3, 9 Pages.
Nov. 22, 2017 First Office Action DE Application No. 102015211744.8, 11 Pages.
Dec. 1, 2017 Second Office Action CN Application No. 201410129013.9, 11 Pages.
Dec. 13, 2017 Notice of Allowance U.S. Appl. No. 14/877,604, 39 Pages.
Dec. 18, 2017 Second Office Action CN Application No. 201410207255.5, 22 Pages.
Dec. 29, 2017 Office action (3 months) 1 U.S. Appl. No. 15/302,443, 84 pages.
Jan. 11, 2018 Chinese First Office Action CN Application No. 201580018557.0, 16 Pages.
Mar. 6, 2018 Japan First Office Action JP Application No. 2014075465, 9 Pages.
Mar. 19, 2018 Notice of Allowance U.S. Appl. No. 14/877,604, 40 Pages.
Apr. 12, 2018 Notice of Allowance U.S. Appl. No. 15/190,284, 60 Pages.
May 29, 2018 Notice of Allowance CN Application No. 201410129013.9, 4 Pages.
Jun. 5, 2018 Chinese Office Action CN Application No. 201410207255.5, 10 Pages.
Jun. 6, 2018 German Office Action DE Application No. 102013209371.3, 4 Pages.
Jun. 27, 2018 Notice of Allowance IL Application No. 231436, 8 Pages.
Jul. 24, 2018 Foreign Office Action for German Application No. 102017212054.1, 5 Pages.
Jul. 24, 2018 Office Action German Application No. 102012200690, 4 pages.
Aug. 28, 2018 Japan Office Action JP Application No. 2014075465, 3 Page.
Sep. 13, 2018 Chinese Office Action CN Application No. 201580018557.0, 8 Pages.
Nov. 7, 2018 Notice of Allowance DE Application No. DE102017212054.1, 12 Pages.
Nov. 19, 2018 Office Action CN Application No. CN201580018557.0, 8 Pages.
Jan. 10, 2019 Notice of Allowance CN Application No. 201410207255.5, 5 Pages.
Feb. 19, 2019 Notice of Allowance CN Application No. 201580018557.0, 5 Pages.

(56) References Cited

OTHER PUBLICATIONS

Mar. 5, 2019 Japan Notice of Allowance JP Application No. 2014075465, 2 Pages.
Mar. 8, 2019 Non-Final Office Action U.S. Appl. No. 15/937,262, 50 Pages.
Mar. 11, 2019 Foreign Office Action CN Application No. 201610851376.2, 14 Pages.
May 5, 2019 Chinese Office Action (Non-US) CN Application No. 201610245208.9 (CN106064245A), 26 Pages.
Jun. 13, 2019 Non-Final Office Action for U.S. Appl. No. 15/681,811, 18 Pages.
Jan. 29, 2020 Notice of Allowance U.S. Appl. No. 15/681,811, 75 Pages.
Feb. 3, 2020 Exam Notice CN Application No. 201810208355.8, 2 Pages.
May 27, 2020 Chinese Office Action (Non-US) CN Application No. 201810208355.8 (CN108655428A), 10 Pages.
Jun. 16, 2020 Notice of Allowance U.S. Appl. No. 15/681,811, 16 Pages.
Oct. 7, 2020 Non-Final Office Action U.S. Appl. No. 16/034,891, 54 pages.
Dec. 14, 2020 German Office Action (Non-US) DE Application No. 102017205166.3 (DE102017205166A1), 9 Pages.
Jan. 6, 2021 Final Office Action U.S. Appl. No. 16/034,891, 14 pages.
Feb. 2, 2021 Chinese Office Action (Non-US) CN Application No. 201810208355.8 (CN108655428A), 9 Pages.
Mar. 1, 2021 Chinese Office Action (Non-US) CN Application No. 201810762240.3 (CN109249188A), 8 Pages.
Mar. 15, 2021 Advisory Action (PTOL-303) U.S. Appl. No. 16/034,891 3 pages.
May 20, 2021 Office Action (non-US) CN Application No. CN201810208355 (108655428A), 7 Pages.
Aug. 26, 2021 Non-Final Office Action U.S. Appl. No. 16/034,891, 16 pages.
Oct. 22, 2021 Chinese Office Action CN Application No. 201810762240.3, 11 Pages.
Mar. 16, 2022 Final Office Action U.S. Appl. No. 16/034,891, 7 pages.
May 7, 2022 Office Action (non-US) CN App. No. 109249188A.
Jun. 9, 2022 Final Office Action U.S. Appl. No. 16/034,891, 10 pages.
Sep. 28, 2022 Notice of Allowance U.S. Appl. No. 16/034,891, 9 pages.
Nov. 7, 2022 Foreign Office Action Chinese Application No. 201810762240.3, 14 pages.
Dec. 22, 2022 Foreign Office Action Chinese Application No. 201610851376.2, 23 Pages.
Jan. 17, 2023 Foreign Office Action Japanese Application No. 20200509460, 2 Pages.
Jan. 20, 2023 Foreign Office Action Chinese Application No. CN201811588752.9, 18 Pages.
Mar. 17, 2023 Foreign Office Action Chinese Application No. CN201610851376.2, 30 Pages.
Apr. 22, 2023 Foreign Office Action Chinese Application No. CN201810762240.3, 12 Pages.
Jun. 14, 2023 Foreign Office Action Chinese Application No. CN201810208355.8, 19 Pages.
Aug. 29, 2023 Foreign Office Action Chinese Application No. CN201810208355.8, 20 Pages.
Brochure "Ken-Tip Drill," Kennametal Inc., Latrobe, PA, pp. H112-H115.
Catalogue 2071: "Holemaking New Products," Kennametal Inc., Latrobe, PA2002, 54 pages.
European Search Report for European Application No. 03003151.2, dated Sep. 29, 2004, 7 Pages.
European Search Report for European Application No. 96109374.7, dated Oct. 2, 1996, 6 Pages.
Extended European Search Report for European Application No. 09004978.4, dated Jun. 16, 2009, 5 Pages.
Extended European Search Report for European Application No. 12002361.9, dated Jul. 9, 2012, 7 Pages.
Extended European Search Report for European Application No. 17922879.6, dated Apr. 23, 2021, 8 Pages.
Gaspar Erich Stemmer: "Ferramentas De Corte II," 1995, 5 Pages.
International Preliminary Report on Patentability for corresponding Application No. PCT/US2004/040829, dated May 8, 2006, 6 pages.
International Preliminary Report on Patentability for International Application No. PCT/2017/055139, dated Mar. 5, 2020, 14 Pages.
International Preliminary Report on Patentability for International Application No. PCT/EP2004/005974, dated Sep. 26, 2005, 12 Pages.
International Preliminary Report on Patentability for International Application No. PCT/EP2015/056288, dated Oct. 20, 2016, 9 Pages.
International Search Report and Written Opinion of the International Searching Authority, or the Declaration, in corresponding Application PCT/US2004/040829, dated Jun. 1, 2005, 9 pages.
International Search Report for International Application No. PCT/EP2003/001526, dated Jun. 18, 2003, 6 pages.
International Search Report for International Application No. PCT/US2002/030136, dated Dec. 19, 2002, 1 page.
International Search Report with Written Opinion for International Application No. PCT/2017/055139, dated Apr. 27, 2018, 16 pages.
International Search Report with Written Opinion for International Application No. PCT/EP2004/005974, dated Dec. 3, 2004, 9 pages.
Ogawa M., et al., "Micro Drilling of 5056 Wrought Aluminum Alloy," Keikinzoku/Journal of Japan Institute of Light Metals, Sep. 1994, vol. 44, No. 9, pp. 486-491.
Partial European Search Report for European Application No. 03003151.2, dated Jul. 7, 2003, 5 Pages.
"Practical Tool Technology for Metal Cutting," Taiyuan Metal Cutting Tools Association, Oct. 31, 1993, pp. 152-153, Machinery Industry Press.
Rocek V., "Cutting Tools for Special Machine Construction and Automatic Production Cycle Lines," German Publication, Technical Publisher Gnter Grossmann GmbH, Stuttgart-Vaihingen, 1972, pp. 78-79.
Supplementary European Search Report for European Application No. 02761793.5, dated Apr. 9, 2008, 3 Pages.
Supplementary European Search Report for European Application No. 04813182.5, dated Jul. 1, 2008, 4 Pages.
Sep. 21, 2023 Foreign Office Action Indian Application No. IN201941023475, 6 Pages.

INDEXABLE DRILLING INSERTS

RELATED APPLICATION DATA

The present application claims priority pursuant to 35 U.S.C. § 119(a) to Indian Patent Application Number 201941023475 filed Jun. 13, 2019, which is incorporated herein by reference in its entirety.

FIELD

The present invention relates to cutting tools, including drilling inserts and drilling bodies. In particular, the present invention relates to indexable and replaceable drilling inserts and drilling bodies configured to engage and secure the indexable and replaceable drilling inserts.

BACKGROUND

Drilling tools are used to drill cylindrical holes in metallic work pieces. The cutting or boring action of the drilling tools may be carried out by an elongated, substantially cylindrical drilling tool, such as a combination of a tool holder and a drill insert, which is selectively attached thereto. Such an arrangement may then be used in an application wherein one end of the tool holder is securely mounted in a driving apparatus, which rotates the holder about its longitudinal axis. At the opposite end of the elongated tool holder, the cutting insert engages the material to be cut. Alternatively, the work piece may be made to rotate relative to the holder and cutting insert, such as in positioning the holder in the tail stock of a lathe or the like. Further, the tool and work piece may be made to rotate relative to one another. The use of cutting inserts allows for quick changing of the insert upon wear of the cutting surfaces instead of the entire tool, and allows for one tool to be used for a variety of different hole-making applications by simply changing the insert and not the entire drill assembly.

Indexable drill inserts allow all the sides of an insert to be used for cutting one after the other. Further, use of inserts reduces the manufacturing lead time and assembling time.

Conventional quadrangular indexable drill inserts comprise four cutting edges for cutting the work piece. The use of cutting edges generally makes the drill drift away from its center because of the unbalanced forces. Conventional indexable drill inserts rub the surface of the drilled hole, if the diameter of the drill hole is less than the pre-desired value.

SUMMARY

Drilling inserts having four cutting edges and drilling bodies are provided. The four cutting edges may each comprise a plurality of cutting edge segments. The plurality of cutting edge segments are provided at distinct angles with respect to a reference plane of the drilling insert to provide effective centering and penetration into a work piece at entry, effective chip breaking and a stronger cutting edge at the drilling insert corners. Furthermore, the side surfaces of the drilling inserts allow the drilling insert to be more stably supported in a pocket of the drilling body. The drilling inserts are used in the central and peripheral pockets of the drilling body. As understood by those skilled in the art, the insert seated in a central pocket may also be referred to as an inboard insert, and the insert seated in a peripheral pocket may also be referred to as an outboard insert.

An aspect of the present invention is to provide a drilling insert comprising a top surface, a bottom surface having a smaller surface area than the top surface, four side surfaces adjoining the top surface and the bottom surface, and four cutting edges at the intersection of each of the side surfaces and the top surface defining four corner edge portions at intersections between adjacent cutting edges, each of the cutting edges comprising a first cutting edge segment extending from a first one of the corner edge portions adjacent to a central longitudinal rotational axis of a drilling body when the drilling insert is mounted in the drilling body at a first cutting edge angle with respect to a reference plane passing through the center of adjacent corner edge portions and parallel to an axis of rotation of the drilling insert, a second cutting edge segment located radially away from the central longitudinal rotational axis of the drilling body in relation to the first cutting edge segment at a second cutting edge angle with respect to the reference plane, and a third cutting edge segment extending from the second cutting edge segment at a third cutting edge angle with respect to the reference plane to a second one of the corner edge portions.

Another aspect of the present invention is to provide a drilling tool system comprising a drilling body having a central longitudinal rotational axis, and comprising an interior pocket in a front drilling face, the interior pocket comprising a rear surface, and a first sidewall portion extending forward from the rear surface and a central drilling insert mounted in the interior pocket of the drilling body, the central drilling insert comprising a top surface, a bottom surface having a smaller surface area than the top surface, four side surfaces adjoining the top surface and the bottom surface, the four side surfaces structured and arranged to engage the rear surface and the first sidewall portion of the interior pocket of the drilling body, and four cutting edges at the intersection of each of the side surfaces and the top surface defining four corner edge portions at intersections between adjacent cutting edges, each of the cutting edges comprising a first cutting edge segment extending from a first one of the corner edge portions adjacent to the central longitudinal rotational axis of the drilling body at a first cutting edge angle with respect to a reference plane passing through the center of adjacent corner edge portions and parallel to an axis of rotation of the drilling insert, a second cutting edge segment located radially away from the central longitudinal rotational axis of the drilling body in relation to the first cutting edge segment at a second cutting edge angle with respect to the reference plane, and a third cutting edge segment extending from the second cutting edge segment at a third cutting edge angle with respect to the reference plane to a second one of the corner edge portions.

These and other aspects of the present invention will be more apparent from the following description.

DETAILED DESCRIPTION

Figure 1:
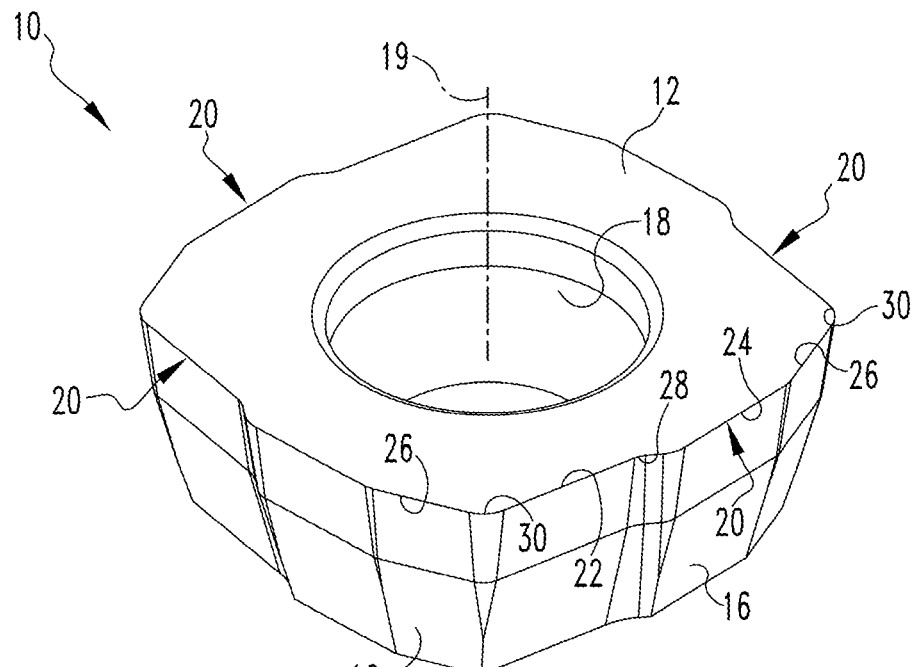
FIG. 1 is a top isometric view of a drilling insert in accordance with an embodiment of the present invention.
Figure 2:
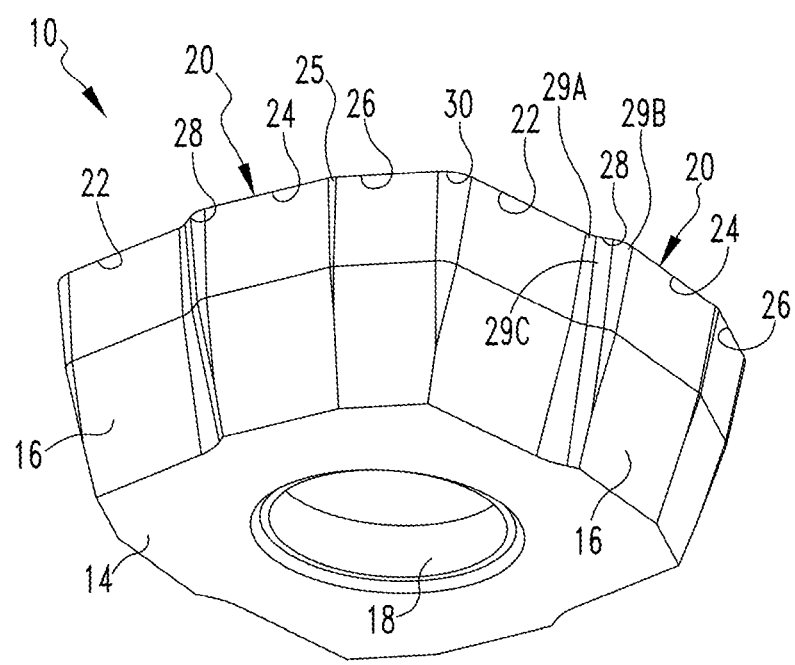
FIG. 2 is a bottom isometric view of the drilling insert of FIG. 1.
Figure 5:
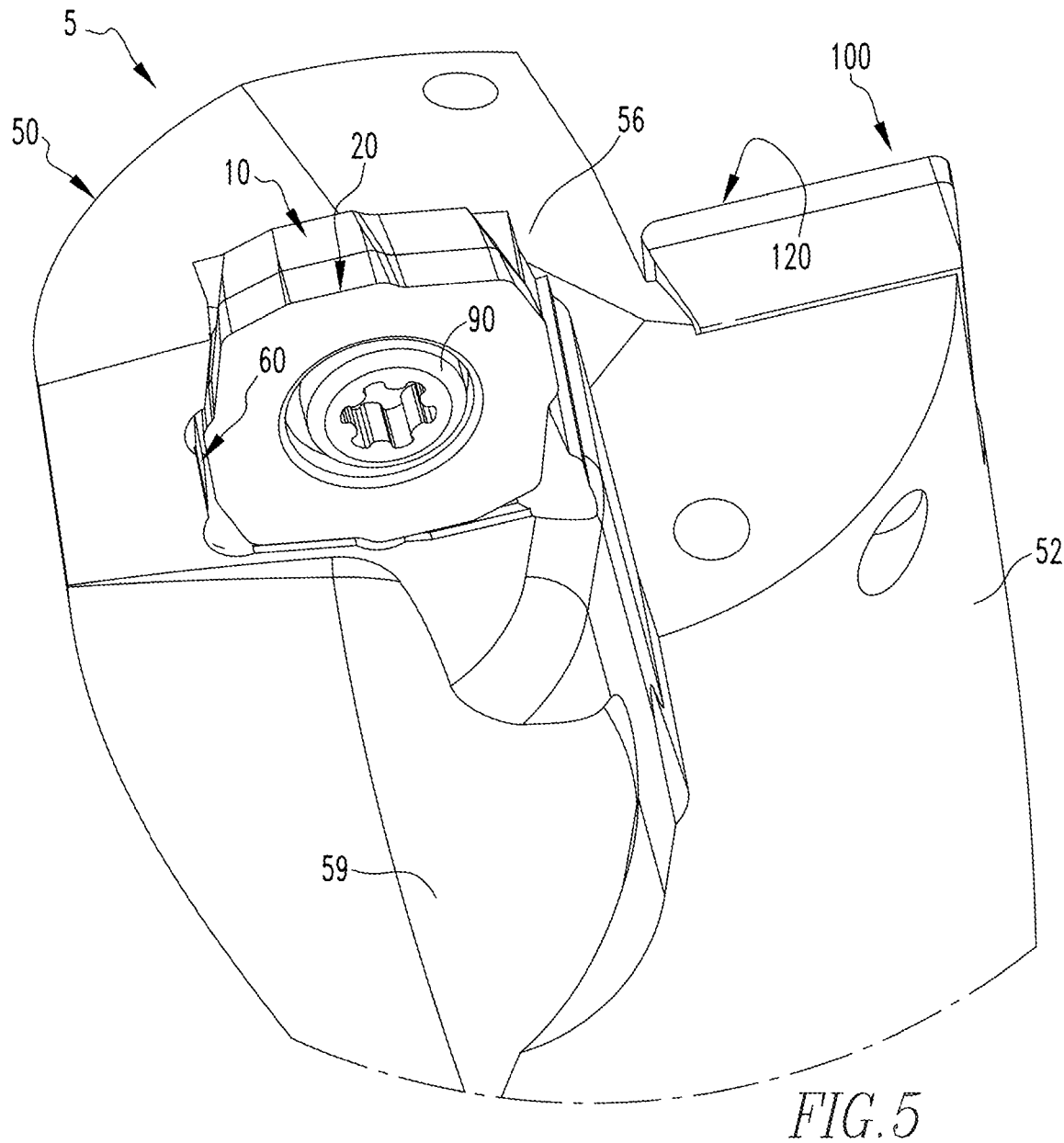
FIG. 5 is an isometric view of a drilling body including a drilling insert in a central pocket of the drilling body and a peripheral insert in a peripheral pocket of the drilling body in accordance with an embodiment of the present invention.
Figure 6:
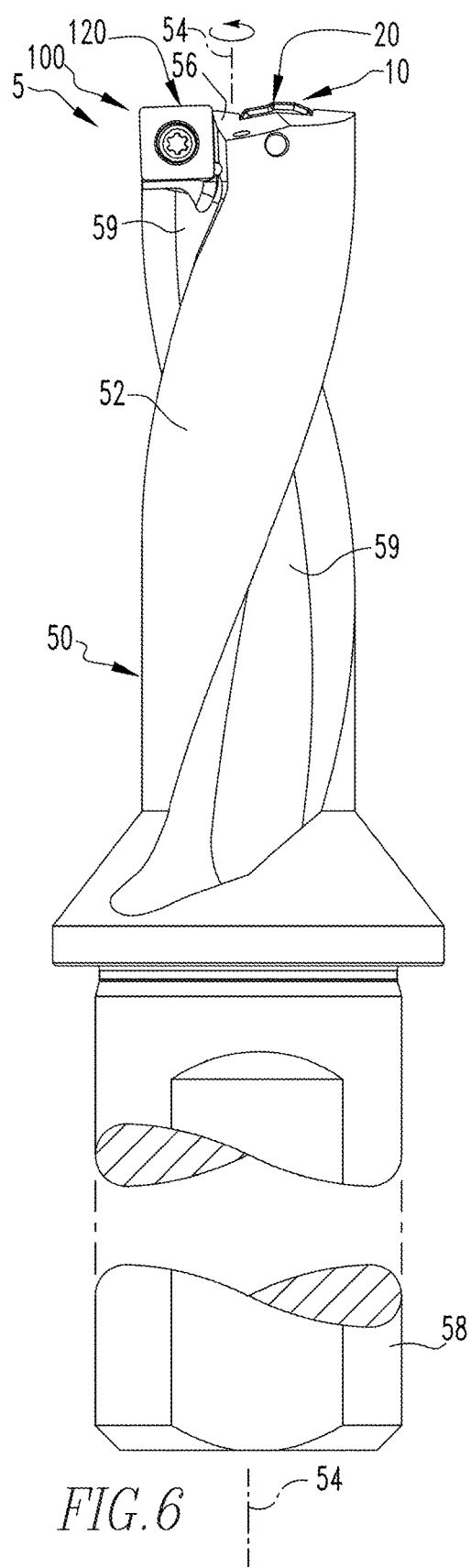
FIGS. 6 and 7 are side views of a drilling body including a drilling insert in a central pocket of the drilling body and a peripheral insert in a peripheral pocket of the drilling body in accordance with an embodiment of the present invention.
Figure 7:
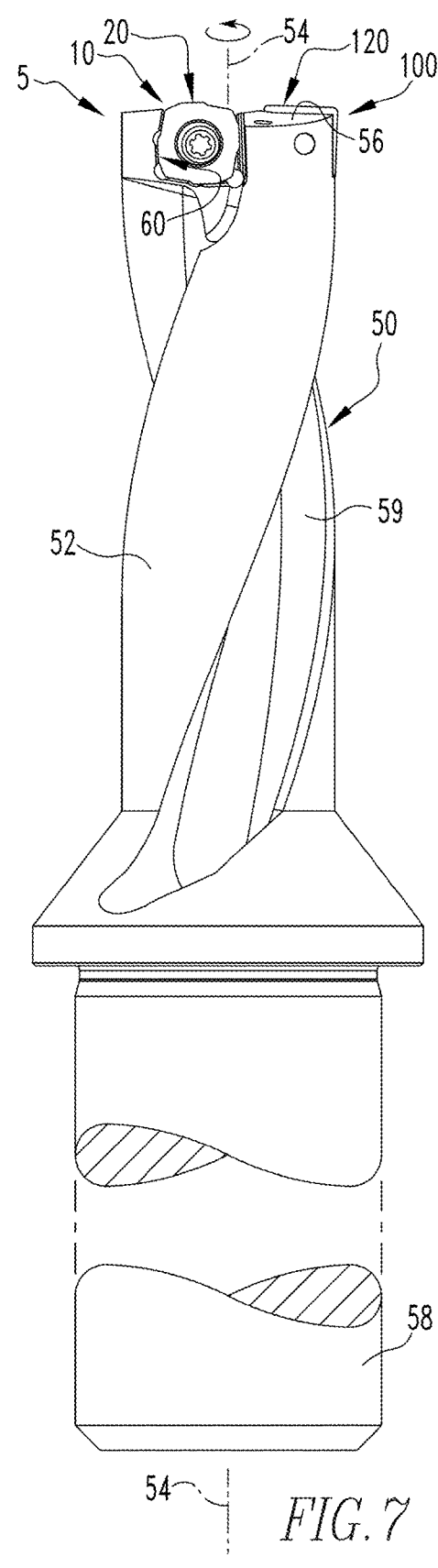

FIGS. 1 and 2 illustrate top and bottom isometric views of an indexable central drilling insert 10 in accordance with an embodiment of the present invention. The drilling insert 10 comprises a top surface 12, a bottom surface 14 and a side surface 16 adjoining the top and bottom surfaces 12 and 14. In accordance with an embodiment of the present invention, the body of the drilling insert 10 is structured and arranged so that the side surfaces 16 slope or slant generally inwardly from the top surface 12 to the bottom surface 14 such the bottom surface 14 may have a smaller surface area than the top surface 12 to provide a positive cutting geometry between the drilling insert 10 and a pocket 60 in a drilling body 50, as shown in FIGS. 5-7. The top surface 12 is intersected by the side surface 16 to form a cutting edge 20 on each side of the drilling insert 10.

As shown in FIGS. 1 and 2, the indexable drilling insert 10 comprises a mounting through hole 18 extending from the top surface 12 to the bottom surface 14. A central insert axis 19 of the mounting through hole 18 is perpendicular to the top surface 12 and the bottom surface 14. The central insert axis 19 defines an axis of rotation of the drilling insert 10. The mounting through hole 18 is structured and arranged to receive an insert screw 90.

In accordance with an embodiment of the present invention, each cutting edge 20 may be formed by a plurality of cutting edge segments. As shown in FIGS. 1-4, each cutting edge 20 is formed by a first cutting edge segment 22, a second cutting edge segment 24 and a third cutting edge segment 26. In accordance with an embodiment of the present invention, the drilling insert 10 is mounted in the drilling body 50 having a generally cylindrical body 52 with a central longitudinal rotational axis 54. In certain embodiments, when the drilling insert 10 is mounted in the drilling body 50, the first cutting edge segment 22 is located radially closer to the central longitudinal rotational axis 54 than the second cutting edge segment 24 and the third cutting edge segment 26, and the third cutting edge segment 26 is located radially outward from the central longitudinal rotational axis 54 compared to the first cutting edge segment 22 and the second cutting edge segment 24.

In accordance with an embodiment of the present invention, each cutting edge 20 may be formed by identical cutting edge segments. In accordance with an embodiment of the present invention, the first, second and third cutting edge segments 22, 24 and 26 are substantially linear. In accordance with an embodiment of the present invention, the orientation and length of the plurality of cutting edge segments 22, 24 and 26 provide effective centering and penetration into a work piece at entry, stronger corner edge portions, prevent drifting of a drilling body 50 from its center and more effectively direct the cutting forces, as further described below.

As shown in FIGS. 6, 7, 10 and 11, the width and location of the central drilling insert 10 and the peripheral insert 100 are selected to allow the operational cutting ranges of the inserts to overlap during rotation of the drilling body 50. In accordance with an embodiment of the present invention, the orientation and length of the plurality of cutting edge segments 22, 24 and 26 of the central drilling insert 10 are selected to allow substantially equal cutting to be performed by the central drilling insert 10 and the peripheral insert 100, as further described below.

Figure 3A:
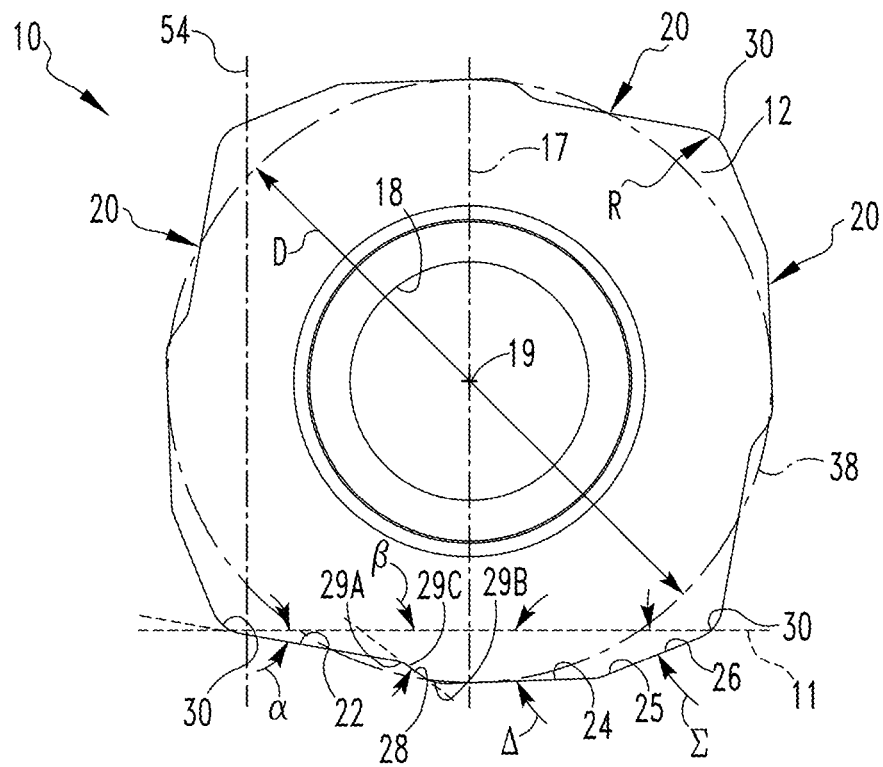
FIGS. 3A and 3B are top views of the drilling insert of FIG. 1.
Figure 3B:
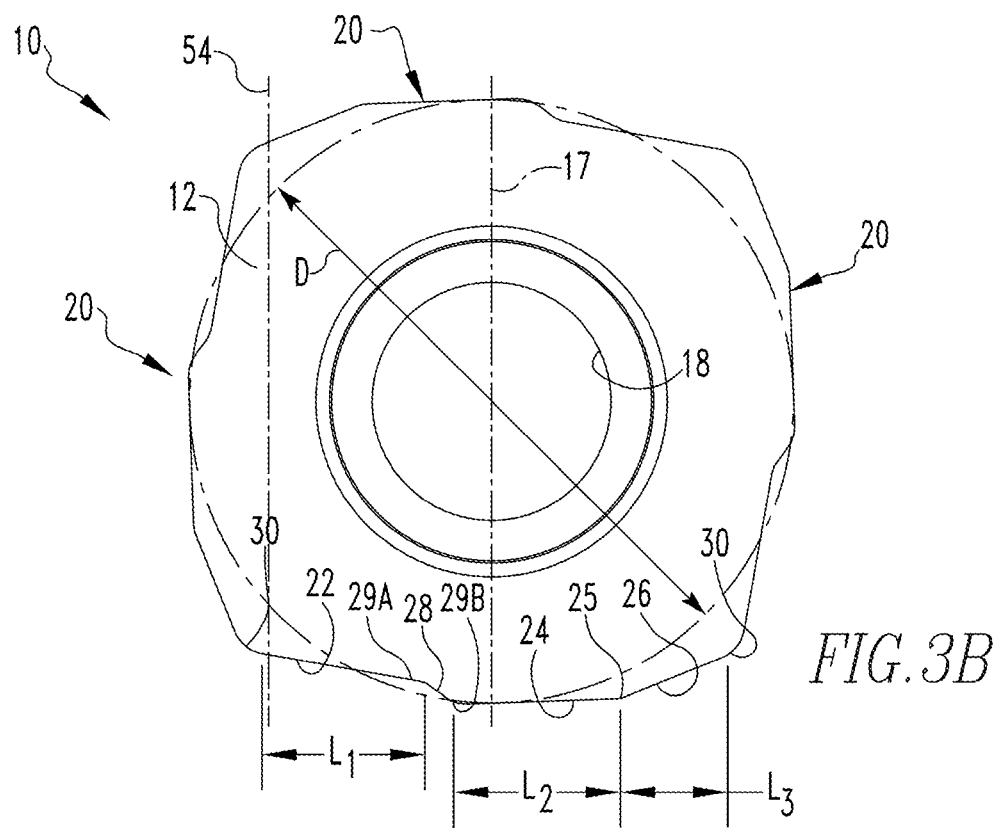

As shown in FIGS. 1, 3A and 3B, each cutting edge 20 of the drilling insert 10 comprises a transitional cutting edge segment 28 connecting the first cutting edge segment 22 to the second cutting segment 24. In accordance with an embodiment of the present invention, the transitional cutting edge segment 28 forms a concave curve 29A with the first cutting edge segment 22 and a convex curve 29B with second cutting edge segment 24. As shown in FIGS. 2 and 3A, the transitional cutting edge segment 28 may include a linear portion 29C between the concave curve 29A formed with the first cutting edge segment 22 and the convex curve 29B formed with the second cutting edge segment 24. Alternatively, the transitional cutting edge segment 28 may be colinear with the first cutting edge segment 22 and form only a convex curve 29B with second cutting edge segment 24. In accordance with an embodiment of the present invention, the transition between the second cutting edge segment 24 and the third cutting edge segment 26 may form a convex curve 25. In accordance with an embodiment of the present invention, the convex curve 29B formed by the intersection transitional cutting edge segment 28 and the second cutting edge segment 24 may be the first portion of the cutting edge 20 to make contact with a work piece, as further described below.

In accordance with an embodiment of the present invention, the indexable drilling insert 10 comprises four corner edge portions 30 formed between adjacent cutting edges 20. As shown in FIG. 3A, each corner edge portion 30 is formed as rounded segment having a radius R that allows for a connection between adjacent cutting edges 20. For example, the corner edge portion 30 may connect a third cutting edge segment 26 of one cutting edge 20 with a first cutting edge segment 22 of a subsequent cutting edge 20. In certain embodiments, the radius R of the corner edge portions 30 may be determined by the overall height of the insert 10 and the diameter D of an imaginary inscribed circle 38. For example, the radius R of each corner edge portion 30 may typically range from 0.1 to 1.6 millimeters. In a particular embodiment, the radius R of each corner edge portion 30 may be about 0.4 millimeter.

As shown in FIGS. 3A and B, a reference plane 11 passes through the center of adjacent corner edge portions 30 of the drilling insert 10 and a vertical reference plane 17 bisects the mounting through hole 18. As used herein, the term "center of a corner edge portion" means the radial outermost point of the corner edge portion 30. As shown in FIG. 3A, the reference plane 11 is parallel to the axis of rotation 19 of the drilling insert 10. In the embodiment shown, the reference plane 11 is normal to the vertical reference plane 17. In the embodiment shown, the vertical reference plane 17 may be substantially parallel to the central longitudinal rotational axis 54 of the drilling body 50. In accordance with an embodiment of the present invention, the orientation of the plurality of cutting edge segments of each cutting edge 20 may be described in relation to the reference plane 11. As shown in FIG. 3A, the first cutting edge segment 22 extends away from a first corner edge portion 30 adjacent to the central longitudinal rotational axis 54 at a first cutting edge angle α with respect to the reference plane 11, which in the embodiment shown is a positive angle. For example, the first cutting edge angle α may be less than about 35 degrees, for example, from 2 to 30 degrees, or from 5 to 20 degrees, or from 7 to 18 degrees. In a particular embodiment, the first cutting edge angle α may be about 9 degrees.

As shown in FIG. 3A, the second cutting edge segment 24 extends radially outward in relation to the first cutting edge segment 22 at a second cutting edge angle A with respect to the reference plane 11, which in the embodiment shown is a negative angle rather than the positive first cutting edge angle α of the first cutting edge segment 22. The second cutting edge angle A may allow for the convex curve 29B formed by the intersection of the transitional cutting edge segment 28 and the second cutting edge segment 24 to be the first contact point with the work piece and allows for the drilling insert 10 to be rigidly secured within a pocket 60 of the drilling body 50. For example, the second cutting edge angle A may typically range from 0.5 to 10 degrees, or from 1 to 7 degrees, or from 1.5 to 5 degrees. In a particular embodiment, the second cutting edge angle A may be about 2 degrees.

In accordance with an embodiment of the present invention, the second cutting edge angle A allows the convex curve 29B formed by the intersection transitional cutting edge segment 28 and the second cutting edge segment 24 to be forward along the central longitudinal rotational axis 54 compared to the convex curve 25 of the transition between the second cutting edge segment 24 and the third cutting edge segment 26. For example, the convex curve 29B may typically be at least 0.02 millimeter axially forward from the convex curve 25, for example, at least 0.05 millimeter, or at least 0.1 millimeter, or at least 1.25 millimeters axially forward from the convex curve 25. The convex curve 29B may typically range from 0.02 to 3 millimeters axially forward from the convex curve 25, for example, from 0.075 to 2 millimeters axially forward, or from 0.1 to 1.5 millimeters axially forward from the convex curve 25 along the central longitudinal rotational axis 54.

As shown in FIG. 3A, the third cutting edge segment 26 extends from a second cutting edge segment 24 at a third cutting edge angle Σ with respect to the reference plane 11 to a second corner edge portion 30 radially outward from the central longitudinal rotational axis 54. In the embodiment shown, the third cutting edge angle Σ is a negative angle and forms a convex curve 25 between the second and third cutting edge segments 24 and 26. The third cutting edge angle Σ is critical because it allows the active cutting lengths of the central drilling insert 10 and the peripheral drilling insert 100 to be substantially equal over a range of cutting diameters. In addition, the third cutting edge segment 26 is provided at the third cutting edge angle Σ to allow the convex curve 29B formed by the intersection of the transitional cutting edge segment 28 and the second cutting edge segment 24 to be the first contact point with the work piece. For example, the third cutting edge angle Σ may typically range from 5 to 75 degrees, or from 7.5 to 45 degrees, or from 10 to 35 degrees. In a particular embodiment, the third cutting edge angle Σ may be about 22 degrees. In accordance with an embodiment of the present invention, a portion of the third cutting edge segment 26 may be farther from the axis of rotation 19 of the drilling insert 10 compared to the first cutting segment 22.

In accordance with an embodiment of the present invention, the linear portion 29C of the transitional cutting edge segment 28 extends radially outward from the first cutting edge segment 22 at a fourth transitional cutting edge angle β with respect to the reference plane 11, which in the embodiment shown is a positive angle. The fourth transitional cutting edge angle β allows the transitional cutting edge segment 28 to form the outermost portion of the cutting edge 20 and may provide a first contact point with the work piece. For example, the fourth transitional cutting edge angle β may typically range from 5 to 85 degrees, or from 10 to 75 degrees, or from 15 to 50 degrees. In a particular embodiment, the fourth transitional cutting edge angle β may be about 38 degrees. In accordance with an embodiment of the present invention, the fourth transitional cutting edge angle β is greater than or equal to the first cutting edge angle α of the first cutting edge segment 22. In certain embodiments, the fourth transitional cutting edge angle β allows the first cutting edge segment 22 to be closer to the reference plane 11 than either the second cutting edge segment 24 and/or at least a portion of the third cutting edge segment 26. For example, the first cutting segment 22 may be closer to the axis of rotation 19 of the drilling insert 10 compared to the second cutting edge segment 24 and a portion of the third cutting edge segment 26.

As shown in FIG. 3B, the first cutting edge segment 22 has a length $L_1$, the second cutting edge segment 24 has a length $L_2$ and the third cutting edge segment 26 has a length $L_3$. The lengths of the plurality of cutting edge segments are selected to provide the desired direction of cutting forces and allow for the rigid clamping of the drilling insert 10 in a pocket. In accordance with an embodiment of the present invention, the length $L_1$ of the first cutting edge segment 22 may typically range from 10 to 40 percent of the diameter D, or from 20 to 35 percent of the diameter D, or from 25 to 30 percent of the diameter D. The length $L_2$ of the second cutting edge segment 24 may typically range from 10 to 40 percent of the diameter D, or from 20 to 35 percent of the diameter D, or from 25 to 30 percent of the diameter D. The length $L_3$ of the third cutting edge segment 24 may typically range from 10 to 40 percent of the diameter D, or from 20 to 35 percent of the diameter D, or from 25 to 30 percent of the diameter D.

Figure 11:
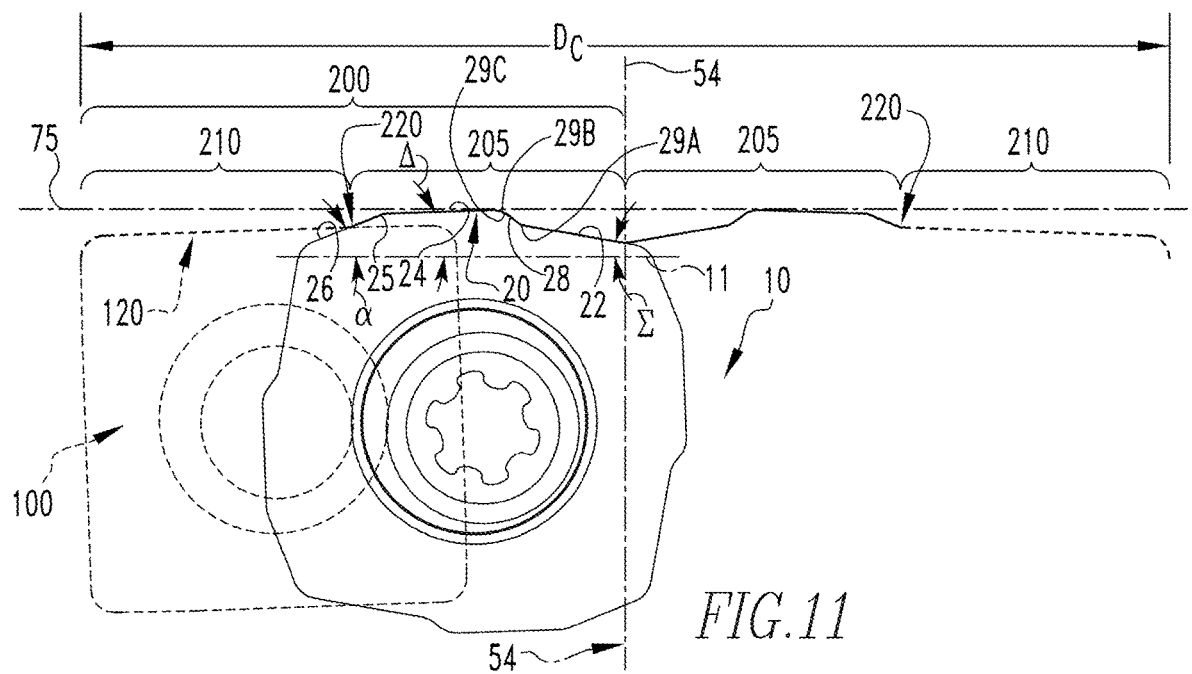
FIG. 11 is a partially schematic side view of a central drilling insert and a peripheral insert in accordance with an embodiment of the present invention.

In certain embodiments, the first cutting edge segment length $L_1$ is selected to allow the convex curve 29B formed by the intersection transitional cutting edge segment 28 and the second cutting edge segment 24 to be located at or between the first corner edge portion 30 radially inward from the central longitudinal rotational axis 54 and the vertical reference plane 17. However, as understood by those skilled in the art, the convex curve 29B formed by the intersection of transitional cutting edge segment 28 and the second cutting edge segment 24 may be formed on either side of the vertical reference plane 17. For example, the convex curve 29B may be formed between the vertical reference plane 17 and a second corner edge portion 30. In accordance with an embodiment of the present invention, the first cutting edge segment length $L_1$ may be greater than either the second cutting edge segment length $L_2$ or the third cutting edge segment length $L_3$. In certain embodiments, second cutting edge segment length $L_2$ is less than the first cutting edge segment length $L_1$ and is greater than the third cutting edge segment length $L_3$. In certain embodiments, the third cutting edge segment length $L_3$ is less than the first cutting edge length $L_1$ and the second cutting edge segment length $L_2$. The third cutting edge segment length $L_3$ is selected to correspond to the overall cutting diameter Dc of the drill body 50 to allow the central drilling insert 10 and the peripheral insert 100 to have substantially equal active cutting edges. In accordance with an embodiment of the present invention, the cutting diameter Dc is provided by a cutting edge 20 of the central drilling insert 10 and a cutting edge 120 of the peripheral insert 100, as shown in FIG. 11.

In accordance with an embodiment of the present invention, the third cutting edge segment 24 length $L_3$ may be equal to $L_C*[(D_{CL}-D_{CS})]$. In certain embodiments, $L_C$ is a constant ranging from 0.25 to 0.85, $D_{CL}$ corresponds to the largest cutting diameter that the drilling insert 10 will be used with, and $D_{CS}$ corresponds to the smallest cutting diameter that the drilling insert 10 will be used with. In accordance with an embodiment of the present invention, $L_C$ is a constant determined based upon the smallest cutting diameter $D_{CS}$, the largest cutting diameter $D_{CL}$, the third cutting edge angle Σ of the third cutting edge segment 26 and the radius R of the corner edge portion 30. In a particular embodiment, the largest cutting diameter $D_{CL}$ may be 19 millimeters and the smallest cutting diameter $D_{CS}$ may be 16.5 millimeters. In accordance with an embodiment of the present invention, the third cutting edge segment 26 length $L_3$ being a function of $L_C*[(D_{CL}-D_{CS})]$ allows the central drilling insert 10 and the peripheral drilling insert 100 to perform a substantially equal amount of cutting.

In accordance with an embodiment of the present invention, the lengths of the cutting edge segments 22, 24 and 26 and the transitional cutting edge segment 28 may be varied depending on the overall size of the drilling insert 10. For example, if the diameter D of an imaginary inscribed circle 38, as shown in FIG. 3B, is increased the lengths of the cutting edge segments 22, 24 and 26 and the transitional cutting edge segment 28 may increase. Alternatively, if the diameter D of the imaginary inscribed circle 38, as shown in FIG. 3B, is decreased the lengths of the cutting edge segments 22, 24 and 26 and the transitional cutting edge segment 28 may decrease.

Figure 4:
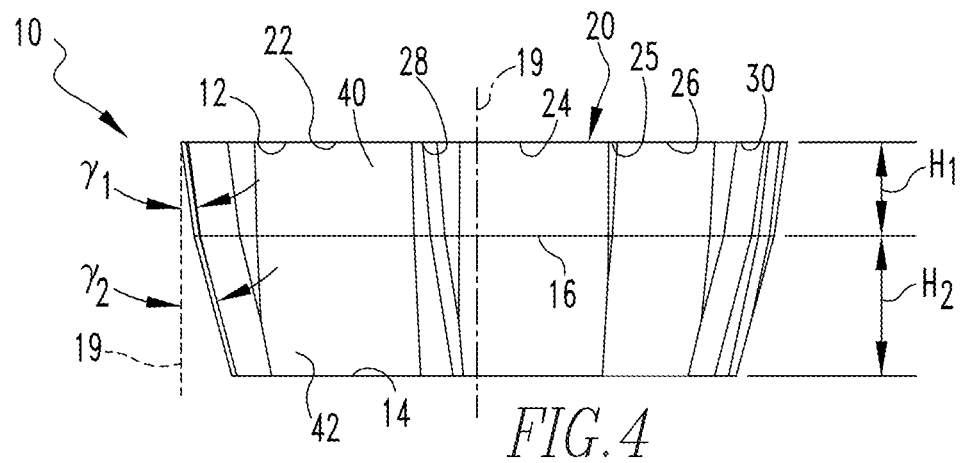
FIG. 4 is a side view of the drilling insert of FIG. 1.

As shown in FIG. 4, each side surface 16 comprises a first clearance face 40 extending from the top surface 12 and a second clearance face 42 extending from the first clearance face 40 to the bottom surface 14. As shown in FIG. 4, the first clearance face 40 extends toward the bottom surface 14 from the top surface 12 at a first clearance angle $\gamma_1$ with respect to the axis of rotation 19 of the drilling insert 10. For example, the first clearance angle $\gamma_1$ may be at least 1 degree, for example from 1 to 30 degrees, or from 2.5 to 20 degrees, or from 5 to 15 degrees. In a particular embodiment, the first clearance angle $\gamma_1$ may be about 8 degrees. The first clearance angle $\gamma_1$ may prevent rubbing of the first clearance face 40 against machined surfaces by providing clearance between the drilling insert 10 and the machined surface of the work piece. As shown in FIG. 4, the second clearance face 42 extends toward the bottom surface 14 from the first clearance face 40 at a second clearance angle $\gamma_2$ with respect to the axis of rotation 19 of the drilling insert 10. For example, the second clearance angle $\gamma_2$ may be at least 1 degree, for example from 5 to 40 degrees, or from 7.5 to 30 degrees, or from 10 to 20 degrees. In a particular embodiment, the second clearance angle $\gamma_2$ may be about 15 degrees. The second clearance angle $\gamma_2$ allows the drilling insert 10 be easily inserted and removed from the pocket 60 of the drilling body 50. In accordance with an embodiment of the present invention, the first clearance angle $\gamma_1$ and the second clearance angle $\gamma_2$ allow for the top surface 12 to be larger than the bottom surface 14. The first clearance angle $\gamma_1$ and the second clearance angle $\gamma_2$ further provide the first and second clearance faces 40 and 42 at orientations that allow for the drilling insert to be rigidly secured in the pocket 60 of the drilling body 50. In the embodiment shown, the second clearance angle $\gamma_2$ is greater than the first clearance angle $\gamma_1$, however any other suitable arrangement may be used, e.g., the second clearance angle $\gamma_2$ may be less than or equal to the first clearance angle $\gamma_1$.

As shown in FIG. 4, the first clearance face 40 has a height $H_1$ and the second clearance face 42 has height $H_2$. In accordance with an embodiment of the present invention, the second clearance face height $H_2$ may be greater than or equal to the first clearance face height $H_1$, e.g., up to 75 percent higher. For example, the second clearance face height $H_2$ may be at least 25 percent, or at least 35 percent, or at least 50 percent greater than the first clearance face height $H_1$. In certain embodiments, the second clearance face height $H_2$ is at least 50 percent of a total height of the drilling insert 10, e.g., at least 60 percent of the total height of the drilling insert. The first clearance face height $H_1$ and the second clearance face height $H_2$ are selected to allow the drilling insert 10 to be rigidly secured within a pocket 60 of the drilling body 50. The ratio of height $H_1$ of the first clearance face 40 to the height $H_2$ of the second clearance face 42 may typically range from 1:1 to 1:10, for example, from 1:1.2 to 1:5 or from 1.5:2 to 1:3. In accordance with an embodiment of the present invention, the first clearance face 40 may provide an abutment surface to be engaged in the pocket 60, and the second clearance face 42 provides a clearance to prevent the drilling insert from contacting the machined surface of the work piece.

The drilling inserts 10 may be made of any suitable material, such as tool steels, cemented carbides, and superhard material, such as cubic boron nitride (CBN), polycrystalline cubic boron nitride (PCBN), polycrystalline diamonds (PCD), tungsten carbide (WC), cermet, ceramic, and the like. The drilling inserts 10 of the present invention may be fabricated by any suitable technique, such as carbide powder pressing, grinding or additive manufacturing to provide the plurality of cutting edge segments.

FIGS. 5-7 illustrate a drilling tool system 5 in accordance with an embodiment of the present invention. The drilling tool system 5 includes a drilling body 50 and an inboard drilling insert 10 and a peripheral or outboard drilling insert 100 installed within the drilling body 50. The drilling body 50 has a generally cylindrical body 52 with a central longitudinal rotational axis 54. In accordance with an embodiment of the present invention, the generally cylindrical body 52 of the drilling body 50 includes a front drilling face 56, a rear mounting end 58 and a plurality of helical flutes 59. The front drilling face 56 comprises an interior pocket 60 structured and arranged to receive a central drilling insert 10 and a peripheral pocket 102 structured and arranged to receive a peripheral drilling insert 100. In the embodiment shown, the generally cylindrical body 52 of drilling body 50 includes two flutes 59, but any other suitable number of flutes may be used. For example, there may be one, three, four, five or more flutes.

Figure 8:
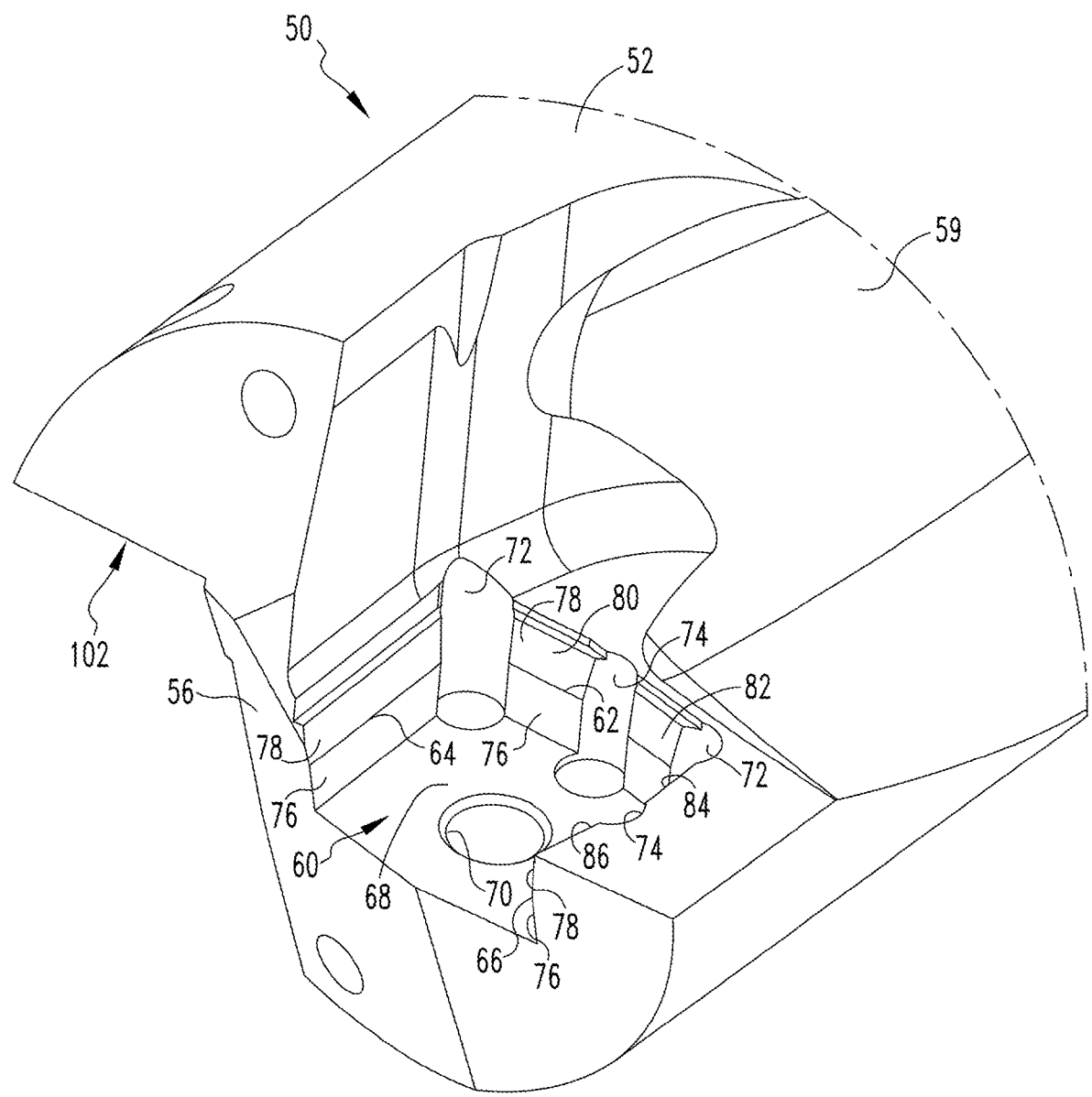
FIG. 8 is an isometric view of a drilling body in accordance with an embodiment of the present invention.
Figure 9:
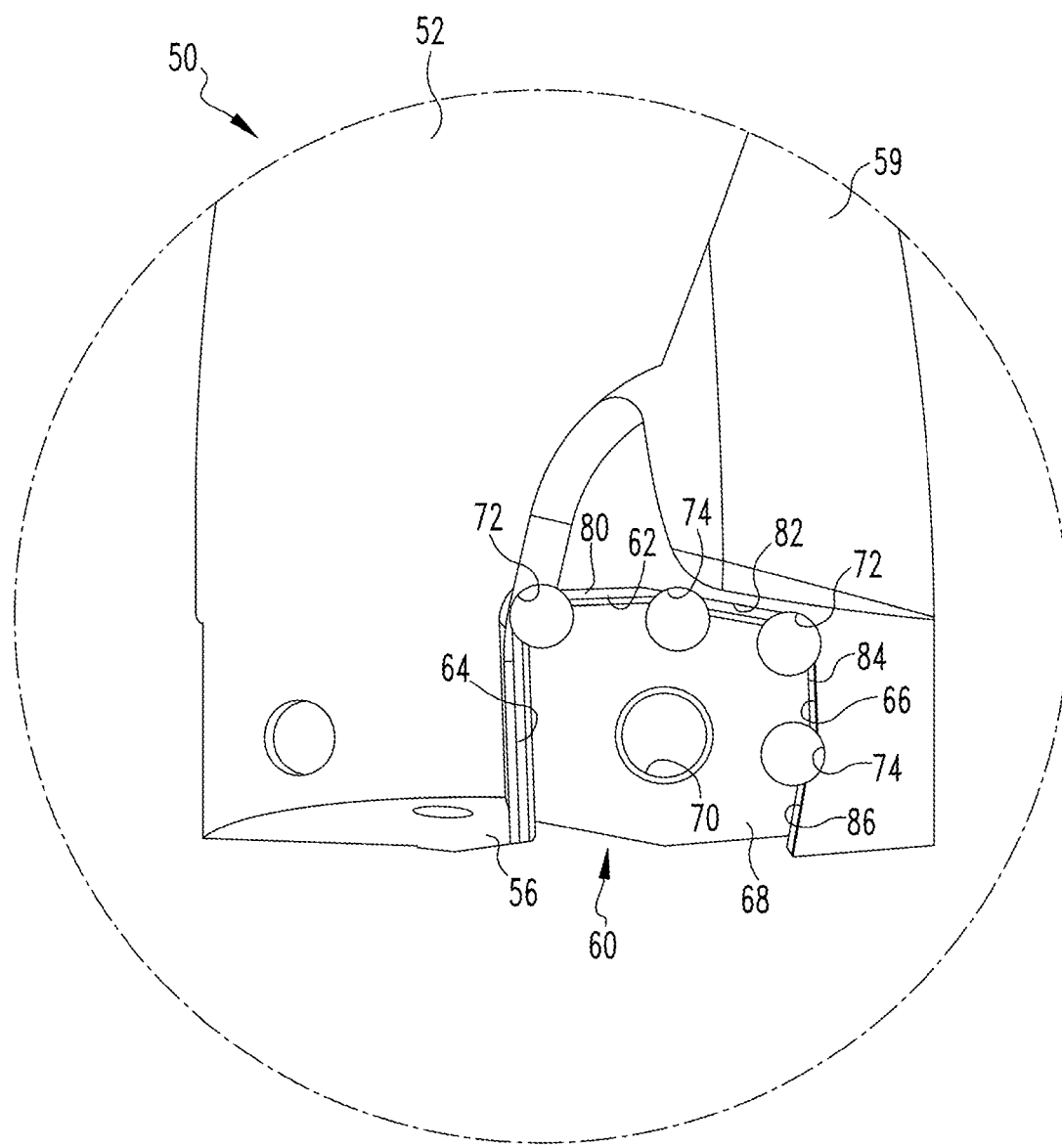
FIG. 9 is a side view of a drilling body in accordance with an embodiment of the present invention.

As shown in FIGS. 8 and 9, the insert pocket 60 comprises a rear surface 62, a first sidewall portion 64 extending generally perpendicularly forward from the rear surface 62 and a second sidewall portion 66 extending generally perpendicularly forward from the rear surface 62. While a generally square insert pocket 60 is shown in this embodiment, any other suitable shape of insert pocket may be used, e.g., rectangular, triangular or the like. As shown in FIGS. 8 and 9, the rear surface 62 may be configured to engage with a first side surface 16 of the drilling insert 10, the first sidewall portion 64 may be configured to engage a second side surface 16 of the drilling insert 10, and the second sidewall portion 66 may be configured to accommodate a third side surface 16 of the drilling insert 10. As used herein, the terms "engage", "engages", and "engagement" and "engaging" mean that two or more features interact with each other to restrict relative movement between the drilling insert 10 and the insert pocket 60. In certain embodiments, the insert pocket 60 may comprise a bottom seating surface 68 perpendicular to the rear surface 62 and the first and second sidewall portions 64 and 66. The bottom seating surface 68 may be configured to engage the bottom surface 14 of the drilling insert 10. As shown in FIGS. 8 and 9, the bottom seating surface 68 includes a threaded mounting hole 70 that may be configured to receive a mechanical fastener 90 to secure the drilling insert 10 in the insert pocket 60.

As shown in FIGS. 8 and 9, the pocket 60 may include recessed channels 72 in the corners between the rear surface 62 and the first and second sidewall portions 64 and 66. The recessed channels 72 provide a clearance for the insert pocket 60 to receive the drilling insert 10. In certain embodiments, the rear surface 62 and the second sidewall portion 66 may further include cutting edge channels 74 located to receive transitional cutting edge segments 28 of the drilling insert 10. The cutting edge channels 74 are recessed in the rear surface 62 and the second sidewall portion 66 to the prevent the transitional cutting edge segments 28 from contacting the pocket 60. The side surfaces 16 contacting the rear surface 62 and the first sidewall portion 64 may experience the most force during drilling operations. In accordance with an embodiment of the present invention, when the drilling insert 10 is mounted in the insert pocket 60 only the side surface 16 corresponding to the second cutting edge segment 24 may contact the first sidewall portion 64. In accordance with an embodiment of the present invention, any suitable size or shape of insert pocket 60 may be used to engage any shape or size of indexable drilling insert 10.

In the embodiment shown, the rear surface 62 and the second sidewall portion 66 are formed by a plurality of segments. For example, the rear surface 62 comprises a first rear surface segment 80 extending from the recessed channel 72 between the first sidewall portion 64 and the rear surface 62 to a cutting edge recess 74, and a second rear surface segment 82 extending from the cutting edge recess 74 to the recessed channel 72 between the rear surface 62 and the second sidewall portion 66. The second sidewall portion 66 comprises a rearward second sidewall segment 84 extending from the recessed channel 72 between the rear surface 62 and the second sidewall portion 66 to a cutting edge recess 74, and a forward second outer sidewall segment 86 extending from the cutting edge recess 74 to the front drilling face 56. In accordance with an embodiment of the present invention, the second rear surface segment 82 is structured and arranged to engage the side surface 16 corresponding to the first cutting edge segment 22. In certain embodiments, the second sidewall portion 66 does not contact the drilling insert 10. In accordance with an embodiment of the present invention, the first sidewall portion 64 is substantially linear, e.g., the first sidewall portion 64 comprises a single sidewall segment extending from the rear surface 62 to the front drilling face 56. However, any other suitable shape and arrangement of first sidewall portion 64 may be used, e.g., the first sidewall portion 64 may be formed by a plurality of sidewall segments having lengths and angles corresponding to the plurality of cutting edge segments of the drilling insert 10.

As shown in FIGS. 8 and 9, the rear surface 62, the first sidewall portion 64 and the second sidewall portion 66 each include first and second engagement surfaces 76 and 78 structured and arranged to correspond to the first and second clearance surfaces 40 and 42 of the drilling insert 10. In accordance with an embodiment of the present invention, the first engagement surfaces 76 extend perpendicularly from the bottom seating surface 68. In accordance with an embodiment of the present invention, the second engagement surfaces 78 extends from the first engagement surfaces 76 at an angle corresponding to the first clearance angle $\gamma_1$ of the first clearance face 40 of the drilling insert. The first and second engagement surfaces 76 and 78 of the rear surface 62, the first sidewall portion 64 and the second sidewall portion 66 allows for the drilling insert 10 to be more rigidly mounted in the pocket 60. In certain embodiments, the second engagement surface 78 of the first sidewall portion 64 contacts the drilling insert 10.

In accordance with an embodiment of the present invention, the insert pocket 60 and the drilling insert 10 are structured and arranged to allow the convex curve 29B formed between the transitional cutting edge segment 28 and the second cutting edge segment 24 to make first contact with a work piece. In certain embodiments, the second cutting edge segment 24 makes a lead angle with the longitudinal rotational axis 54 of the drill body, e.g., from 1 to 5 degrees. The positioning of the drilling insert 10 in the pocket 60 of the drilling body 50, and the angles and orientation of the cutting edge segments 22, 24 and 28 and transitional cutting edge 28 directs the cutting forces toward the longitudinal rotational axis 54 of the drilling body. Directing the forces toward the rotational axis of the drill balances the cutting forces that the drilling body 50 experiences during the drilling process and thus keeps the drill from drifting away from the center.

The drilling body 50 may be made of any suitable material, such as steel, stainless steel or any other material having sufficient strength. The drilling body 50 of the present invention may be fabricated by any suitable technique, such as machining to provide the insert pockets and flutes.

Figure 10:
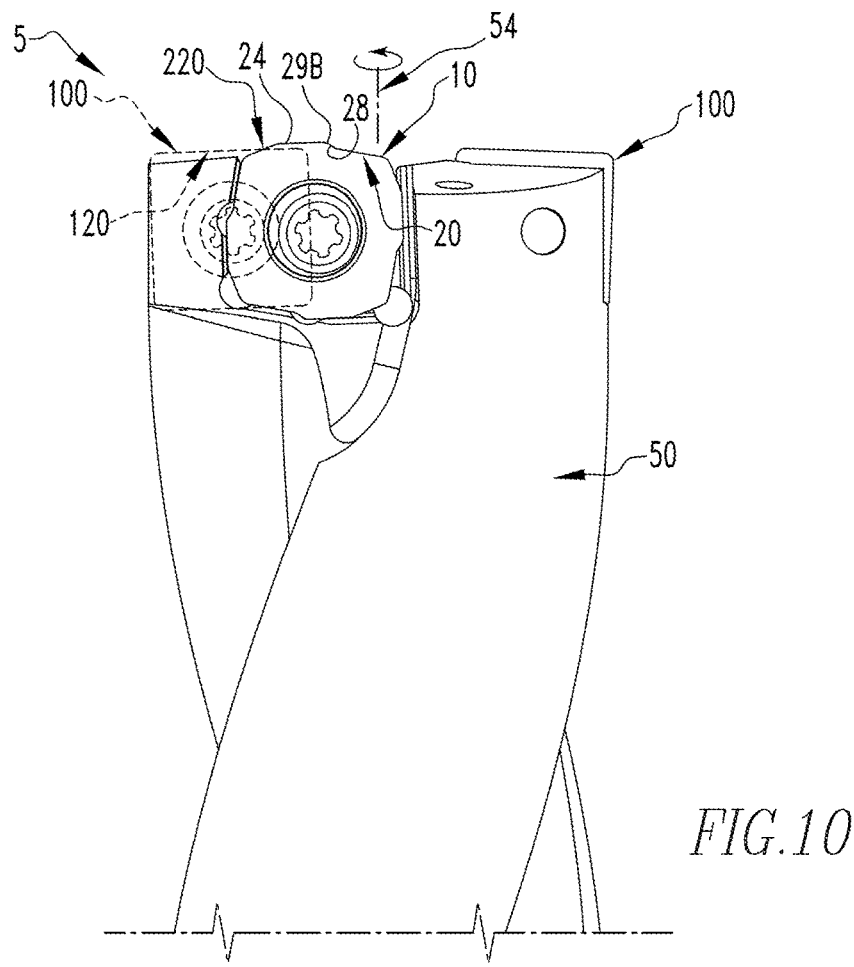
FIG. 10 is a partially schematic side view of a drilling insert in a central pocket of the drilling body and a peripheral insert in a peripheral pocket of the drilling body in accordance with an embodiment of the present invention.

As shown in FIGS. 10 and 11, the cutting edge 20 of the central drilling insert 10 and the cutting edge 120 of the peripheral insert 100 form a cutting profile 200. FIG. 10 illustrates in phantom the positioning of the peripheral insert 100 compared to the central drilling insert 10 when the drilling body 50 is rotated 180 degrees about its central longitudinal rotational axis 54 in accordance with an embodiment of the present invention. As shown in FIG. 11, the cutting edge 20 of the central drilling insert 10 forms an inner portion 205 of the cutting profile 200 and the cutting edge 120 of the peripheral insert 100 forms an outer portion 210 of the cutting profile 200 relative to the central longitudinal rotational axis 54. The cutting profile 200 formed by the cutting edge 20 of the central drilling insert 10 and the cutting edge 120 of the peripheral insert 100 is symmetrical about the central longitudinal rotational axis 54 of the drilling body 50. The rotation of the cutting profile 200 about the rotational axis forms the cutting diameter Dc of the drilling tool system 5.

In accordance with an embodiment of the present invention, the cutting edge 20 of the central drilling insert 10 may overlap with the cutting edge 120 of the peripheral insert 100. As shown in FIG. 11, an intersection point 220 is formed at the point that the third cutting edge segment 26 overlaps with the cutting edge 120 of the peripheral insert 100. In accordance with an embodiment of the present invention, the intersection point 220 is selected to allow the length of the inner portion 205 of the cutting profile 200 to be substantially equal to the length of the outer portion 210 of the cutting profile 200. However, in accordance with an embodiment of the present invention, the length of the inner portion 205 may be unequal to the length of the outer portion 210. In accordance with an embodiment of the present invention, the portion of the third cutting edge segment 26 that is located between the intersection point 220 and the second corner edge portion 30 may not contact the work piece.

FIGS. 10 and 11 illustrate that the convex curve 29B of the transitional cutting edge segment 28 at the point the transitional cutting edge segment 28 meets the second cutting edge segment 24 forms the most axially forward portion of the cutting profile 200. This allows the convex curve 29B to make first contact the work piece. In accordance with an embodiment of the present invention, a partial length of the inner portion 205 of the cutting profile 200 is more axially forward than the outer portion 210 of the cutting profile 200. In a particular embodiment, the entire length of the second cutting segment 24 of the central drilling insert 10 is more axially forward than the cutting edge 120 of the peripheral insert 100.

As shown in FIG. 11, a horizontal plane 75 is normal to the central longitudinal rotational axis 54 of the drilling body 50. In the embodiment shown, the horizontal plane 75 is parallel to the reference plane 11. Alternatively, the reference plane 11 may be tilted with respect to the horizontal plane 75 at a negative angle. For example, the reference plane 11 may be provided at an angle of from 0 to 10 degrees, or from 0 to 7 degrees, or from 0 to 5 degrees with respect to the horizontal plane 75. In certain embodiments, the first cutting edge segment 22 extends radially outward from the central longitudinal rotational axis 54 at a positive angle toward the horizontal plane 75. In certain embodiments, the second cutting edge segment 24 extends radially outward from the central longitudinal rotational axis 54 at a shallow negative angle away from the horizontal plane 75. In certain embodiments, the third cutting edge segment 26 extends radially outward from the central longitudinal rotational axis 54 at a negative angle away from the horizontal plane 75. In certain embodiments, the transitional cutting edge segment 28 extends radially outward from the central longitudinal rotational axis 54 at a positive angle toward the horizontal plane 75. As shown in FIG. 11, the shallow negative angle of the second cutting edge segment 24 and the positive angle of the transitional cutting edge segment 28 may allow the convex curve 29B to be the closest portion of the cutting profile 200 to the horizontal plane 75. As shown in FIG. 11, the convex curve 29B may be the farthest point of the cutting edge 20 from the reference plane 11.

In accordance with an embodiment of the present invention, the orientation and length of the plurality of cutting edge segments 22, 24 and 26 and the transitional cutting edge segment 28 of the central drilling insert allow for at least a segment of the inner portion 205 of the cutting profile to contact the work piece before the peripheral insert 100, and allow the cutting profile to be formed substantially equally by the cutting edge 20 of the central insert 10 and the cutting edge 120 of the peripheral insert 100.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

In this application, the use of "horizontal", "vertical", "positive" and "negative" are used as relative terms and it is understood that during use the drilling body and the drilling insert may have different orientations.

Whereas particular embodiments of this invention have been described above for purposes of illustration, it will be evident to those skilled in the art that numerous variations of the details of the present invention may be made without departing from the invention as defined in the appended claims.

The invention claimed is:

1. An inboard drilling insert for a drilling tool system having the inboard drilling insert and an outboard drilling insert, the inboard drilling insert comprising:
   a top surface;
   a bottom surface having a smaller surface area than the top surface;
   four side surfaces adjoining the top surface and the bottom surface; and
   four cutting edges at the intersection of each of the side surfaces and the top surface defining four corner edge portions at intersections between adjacent cutting edges, each of the cutting edges comprising:
      a first cutting edge segment extending from a first one of the corner edge portions adjacent to a central longitudinal rotational axis of a drilling body when the drilling insert is mounted in the drilling body at a first cutting edge angle with respect to a reference plane passing through the center of adjacent corner edge portions and parallel to an axis of rotation of the drilling insert;

a second cutting edge segment located radially away from the central longitudinal rotational axis of the drilling body in relation to the first cutting edge segment at a second cutting edge angle with respect to the reference plane; and a third cutting edge segment extending from the second cutting edge segment at a third cutting edge angle with respect to the reference plane to a second one of the corner edge portions, wherein the third cutting edge segment has a length, $L_3$, equal to $L_C*[(D_{CL}-D_{CS})]$, where $L_C$ is in a range between 0.25 to 0.85, $D_{CL}$ is a largest cutting diameter that will be used with the inboard drilling insert, and $D_{CS}$ is a smallest cutting diameter that will be used with the inboard drilling insert, thereby allowing the inboard drilling insert to perform substantially an equal amount of cutting than the outboard drilling insert.

2. The inboard drilling insert of claim 1, wherein the first cutting edge segment, the second cutting edge segment, and the third cutting edge segment are linear.

3. The inboard drilling insert of claim 1, wherein the first cutting edge angle is a positive angle with respect to the reference plane ranging from about 2 to about 30 degrees.

4. The inboard drilling insert of claim 1, wherein the second cutting edge angle is a negative angle with respect to the reference plane ranging from about 0.5 to about 10 degrees.

5. The inboard drilling insert of claim 1, wherein the third cutting edge angle is a negative angle with respect to the reference plane ranging from about 5 to about 75 degrees.

6. The inboard drilling insert of claim 1, wherein the third cutting edge angle is greater than 20 degrees.

7. The inboard drilling insert of claim 1, wherein the first and second cutting edge segments are joined together by a transitional cutting edge segment, the transitional cutting edge segment forming a concave curve with the first cutting edge segment and a convex curve with the second cutting edge segment.

8. The inboard drilling insert of claim 7, wherein the transitional cutting edge segment comprises a linear portion.

9. The inboard drilling insert of claim 8, wherein the linear portion of the transitional cutting edge segment extends outward from the first cutting edge segment at a fourth transitional cutting edge angle with respect to the reference plane, the fourth transitional cutting edge angle is a positive angle ranging from about 5 to about 85 degrees.

10. The inboard drilling insert of claim 7, wherein the convex curve formed between the transitional cutting edge and the second cutting edge segment is located at or between the first one of the corner edge portions and a vertical reference plane bisecting a mounting through hole.

11. The inboard drilling insert of claim 7, wherein the convex curve formed between the transitional cutting edge and the second cutting edge segment defines a leading contact point of the cutting edge.

12. The inboard drilling insert of claim 7, wherein a transition between the second cutting edge segment and the third cutting edge segment defines convex curve, and the convex curve formed between the transitional cutting edge and the second cutting edge segment is at least 0.02 millimeters forward along the central longitudinal rotational axis than the convex curve of the transition between the second cutting edge segment and the third cutting edge segment.

13. The inboard drilling insert of claim 1, wherein a transition between the first cutting edge segment and the second cutting edge segment defines only a convex curve.

14. The inboard drilling insert of claim 1, wherein the first cutting edge segment is closer to an axis of rotation of the drilling insert than the second cutting edge segment and a portion of the third cutting edge segment.

15. The inboard drilling insert of claim 1, wherein when the drilling insert is mounted in the drilling body the reference plane of the drilling insert is provided at an angle of from 0 to 10 degrees with respect to a horizontal reference plane normal to the central longitudinal axis of the drilling body.

16. The inboard drilling insert of claim 1, wherein each side surface comprises a first clearance face extending from the top surface and a second clearance face extending from the first clearance face to the bottom surface, and a height of the second clearance face is greater than or equal to the height of the first clearance face.

17. The inboard drilling insert of claim 16, wherein the height of the first clearance face is less than 50 percent of a total height of the drilling insert.

18. The inboard drilling insert of claim 16, wherein the first clearance face forms an angle ranging from about 1 to about 30 degrees with respect to an axis of rotation of the drilling insert, and the second clearance face forms an angle ranging from about 5 to about 40 degrees with respect to the axis of rotation of the drilling insert.

19. A drilling tool system comprising:

a drilling body having a central longitudinal rotational axis, and comprising an interior pocket in a front drilling face, the interior pocket comprising:

a rear surface; and a first sidewall portion extending forward from the rear surface; and a central drilling insert capable of being received in the interior pocket of the drilling body and a peripheral cutting insert capable of being received in a peripheral pocket of the drilling body, the central drilling insert comprising:

a top surface;

a bottom surface having a smaller surface area than the top surface;

four side surfaces adjoining the top surface and the bottom surface, the four side surfaces structured and arranged to engage the rear surface and the first sidewall portion of the interior pocket of the drilling body; and four cutting edges at the intersection of each of the side surfaces and the top surface defining four corner edge portions at intersections between adjacent cutting edges, each of the cutting edges comprising:

a first cutting edge segment extending from a first one of the corner edge portions adjacent to the central longitudinal rotational axis of the drilling body at a first cutting edge angle with respect to a reference plane passing through the center of adjacent corner edge portions and parallel to an axis of rotation of the drilling insert;

a second cutting edge segment located radially away from the central longitudinal rotational axis of the drilling body in relation to the first cutting edge segment at a second cutting edge angle with respect to the reference plane; and a third cutting edge segment extending from the second cutting edge segment at a third cutting edge angle with respect to the reference plane to a second one of the corner edge portions,
wherein the third cutting edge segment has a length, $L_3$, equal to $L_C*[(D_{CL}-D_{CS})]$, where
$L_C$ is in a range between 0.25 to 0.85,
$DC_L$ is a largest cutting diameter that will be used with the central drilling insert, and
$D_{CS}$ is a smallest cutting diameter that will be used with the central drilling insert, thereby allowing the central drilling insert to perform substantially an equal amount of cutting than the peripheral drilling insert.

20. The drilling tool system of claim 19, wherein the first and second cutting edge segments are joined together by a transitional cutting edge segment, the transitional cutting edge segment forming a concave curve with the first cutting edge segment and a convex curve with the second cutting edge segment, and the convex curve formed between the transitional cutting edge and the second cutting edge segment is the most forward point along the central longitudinal rotational axis.

* * * * *